United States Patent [19]

Ketcham

[11] Patent Number: 5,008,221
[45] Date of Patent: Apr. 16, 1991

[54] HIGH TOUGHNESS CERAMIC ALLOYS
[75] Inventor: Thomas D. Ketcham, Big Flats, N.Y.
[73] Assignee: Corning Incorporated, Corning, N.Y.
[21] Appl. No.: 537,499
[22] Filed: Jun. 12, 1990

Related U.S. Application Data

[63] Continuation of Ser. No. 926,655, Nov. 4, 1986, abandoned, which is a continuation of Ser. No. 812,469, Dec. 23, 1985, abandoned, which is a continuation-in-part of Ser. No. 722,229, Apr. 11, 1985, abandoned.

[51] Int. Cl.$^5$ .............................................. C04B 35/48
[52] U.S. Cl. .................................. 501/103; 501/104; 501/105; 501/95
[58] Field of Search .................. 501/103, 104, 105, 95

[56] References Cited

U.S. PATENT DOCUMENTS

| | | | |
|---|---|---|---|
| 3,522,064 | 7/1970 | Valdsaar | 501/103 |
| 3,948,813 | 4/1976 | Holcombe et al. | 501/136 X |
| 4,298,385 | 11/1981 | Claussen et al. | 501/105 X |
| 4,360,598 | 11/1982 | Otagiri et al. | 501/136 X |
| 4,366,254 | 12/1982 | Rich et al. | 501/105 X |
| 4,507,394 | 3/1985 | Mase et al. | 501/103 X |
| 4,543,345 | 9/1985 | Wei | 501/89 X |
| 4,770,673 | 9/1988 | Ketcham et al. | 501/105 X |
| 4,886,768 | 12/1989 | Tien | 501/104 |

OTHER PUBLICATIONS

Stevens "An Introduction to Zirconia", pp. 10-11, Jun. 1983.

*Primary Examiner*—Karl Group
*Attorney, Agent, or Firm*—C. S. Janes, Jr.

[57] ABSTRACT

This invention is directed to the production of ceramic alloys consisting essentially of partially stabilized $ZrO_2$ and/or $ZrO_2$-$HfO_2$ solid solution and/or $HfO_2$ exhibiting high toughness through the inclusion of about 0.5-8 mole %, as expressed on the oxide basis, of $YNbO_4$ and/or $YTaO_4$ and/or $MNbO_4$ and/or $MTaO_4$, wherein M represents $Mg^{+2}$, $Ca^{+2}$, $Sc^{+3}$ and/or a rare earth metal ion selected from the group of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$ substituted for Y, and the use of at least 5 volume percent of such ceramic alloys to toughen hard refractory ceramics.

11 Claims, 2 Drawing Sheets

HIGH TOUGHNESS CERAMIC ALLOYS

This is a continuation of application Ser. No. 926,655, filed Nov. 4, 1986, now abandoned, which is a continuation of Ser. No. 812,469, filed Dec. 23, 1985, now abandoned, which is a continuation-in-part application of Ser. No. 722,229, filed Apr. 11, 1985, now abandoned.

BACKGROUND OF THE INVENTION

In like manner to mixtures of two or more metals or nonmetals being termed metal alloys and nonmetal alloys, respectively, mixtures of two or more metal oxides yielding solid solutions have frequently been described as ceramic alloys. One well known example of the latter is stabilized and partially-stabilized $ZrO_2$.

With respect to microstructure, two principal types of partially-stabilized, polycrystalline $ZrO_2$ bodies have been discussed in the prior art. The first type is composed of relatively large size (~30-100 micron) cubic $ZrO_2$ grains, customarily including a dopant, containing precipitates of $ZrO_2$ having a tetragonal structure of submicron size with lower dopant content therewithin, and precipitates of $ZrO_2$ having a monoclinic and/or tetragonal structure of about 1-10 microns in size along the grain boundaries of the cubic grains, thereby yielding a microstructure consisting of a ceramic alloy comprising $ZrO_2$ and one or more stabilizing agents, with MgO and/or CaO and/or $Y_2O_3$ being the most commonly used of such agents. The second type of partially-stabilized, polycrystalline $ZrO_2$ bodies is composed of a ceramic alloy of $ZrO_2$ with one or more stabilizing agents of submicron grain size and most typically having a tetragonal structure. This second type of ceramic alloy is frequently a combination of $ZrO_2$ and $Y_2O_3$, although $CeO_2$ has been used, as could combinations of $Y_2O_3$ with MgO and/or CaO. In principle, any number of the rare earth metal oxides would also be operable for alloying.

$ZrO_2$-containing ceramic bodies exhibiting the highest toughness values have involved MgO stabilization to yield the large grain size microstructure described above. Such bodies have demonstrated toughness values in excess of 10 MPa$\sqrt{m}$ when measured by short beam, chevron notched beam, and single edge notched beam types of $K_{IC}$ tests. In contrast, laboratory testing has shown that the toughness values of the fine-grained $ZrO_2$ ceramic alloys discussed above are substantially lower. For example, a fine-grained body of $ZrO_2$ with 3 mole percent $Y_2O_3$ manifests a $K_{IC}$ of about 6 MPa$\sqrt{m}$, and fine-grained $ZrO_2$ bodies stabilized with 2 mole percent $Y_2O_3$ gave values no higher than about 10 MPa$\sqrt{m}$.

This difference in fracture toughness can be explained on the basis of microstructure. Thus, as was described above, the large grain size bodies not only contain precipitates of submicron size having a tetragonal structure, but also contain precipitates of larger size (~1-10 microns) having a tetragonal and/or monoclinic structure along the grain boundaries. The tetragonal structure of the larger-grained precipitates can transform to the monoclinic polymorph during cooling from the fabrication temperature of the body, or can transform in the stress field set up by a propagating crack. Those relatively large-dimensioned precipitates along the grain boundaries of the cubic $ZrO_2$ that have been transformed into the monoclinic structure are areas of high stress which can act to promote the transformation of the smaller-sized precipitates of tetragonal structure within the cubic grains to the monoclinic form. Optical and electron microscopy examinations have indicated the presence of a large zone, i.e., ~100 microns, of transformed precipitates (both large and small grain) around propagating cracks. It is that large zone of transformation which gives rise to the high toughness.

In contrast, the microstructures of the second type of partially-stabilized $ZrO_2$ bodies are quite uniform with grain sizes generally varying between about 0.3-1 micron, depending upon firing temperature, time at sintering temperature, particle size of the starting batch materials, and composition. There are no fine-grained precipitates formed as each tetragonal grain acts as a single precipitate. There is a lack of development of the large size precipitates along the grain boundaries. As a result, the transformation zone around propagating cracks in this type of body is only on the order of 4 microns or less. It has been mathematically predicted that the level of toughening should be directly proportional to the square root of the dimensions of the transformation zone. The measure of toughness reported above on the two types of bodies qualitatively confirms that prediction.

SUMMARY OF THE INVENTION $YNbO_4$, $YTaO_4$, $MNbO_4$, and $MTaO_4$, where M represents a number of rare earth elements having a valence of $+3$, are compounds having a monoclinic structure at room temperature (R.T.) and a tetragonal structure at high temperatures.

It is my belief that the lack of easy nucleation for the development of monoclinic $ZrO_2$ in the fine-grained, partially-stabilized $ZrO_2$ bodies limits the number of grains that can transform in the stress field of a propagating crack which, in turn, limits the level of toughness that can be achieved. My invention is based upon the proposition that, through the introduction of $YNbO_4$ and/or $YTaO_4$ and/or $MNbO_4$ and/or $MTaO_4$ into partially stabilized $ZrO_2$ bodies, either as a minor second phase or as a solid solution, the nucleation of monoclinic $ZrO_2$ can be rendered easier, while still maintaining the tetragonal crystal structure at room temperature. This ease of nucleation can then improve the toughness of the final product through one or more of the three postulated mechanisms set out below.

The first mechanism assumes the resulting material is composed of two phases, one phase containing a high level of $YNbO_4$ and/or $YTaO_4$ and/or $MNbO_4$ and/or $MTaO_4$, which transforms to monoclinic symmetry either upon cooling or in the stress field of a propagating crack. This conversion then assists the transformation of adjacent grains of the $ZrO_2$-rich phase, by either the production of local high stress fields and dislocations from the ends of the transformation twins along the grain boundary between the two phases, or simply by the stress field associated with the entire grain, especially if the volume change upon the transformation is negative. In the first alternative, it is believed that individual grains high in $YNbO_4$ and/or $YTaO_4$ and/or $MNbO_4$ and/or $MTaO_4$ content behave in like manner to the large-dimensioned precipitates along the grain boundaries of the cubic $ZrO_2$ that have been observed in the microstructures of ceramic alloys having compositions in the $ZrO_2$-MgO systems.

The second mechanism assumes the resulting material is comprised of a single phase solid solution wherein the $YNbO_4$ and/or $YTaO_4$ and/or $MNbO_4$ and/or $MTaO_4$ adjusts the lattice constants and the anisotropic thermal expansion coefficients of the tetragonal and monoclinic phases of the solid solution such that the elastic energy barrier to the formation of the monoclinic phase is lowered, or the addition of $YNbO_4$ and/or $YTaO_4$ and/or $MNbO_4$ and/or $MTaO_4$ "softens" the crystal lattice, thereby lowering the elastic constants and the Peierls stress barrier, and thus ultimately increasing the probability of successful nucleation and growth of monoclinic $ZrO_2$ in the stress field of a crack with consequent enhanced toughness.

The third mechanism involves the production of a ceramic alloy that forms two phases within a single grain by spinodal decomposition or an ordering process, and is deemed to represent an intermediate between the above two mechanisms.

Although examination of the inventive products through scanning electron microscopy and transmission electron microscopy has indicated that some compositions of the material are composed of two phases, it is believed that the second and third postulated mechanisms may also be operating. Hence, the final mechanism underlying the improved toughness of the final product has not been unequivocally elucidated.

Whereas the preferred embodiment of the invention contemplates the addition to $ZrO_2$ partially stabilized with 0.8 to 9 mole percent $YO_{3/2}$ of about 0.5-8 mole percent total of $YNbO_4$ and/or $YTaO_4$ derived from the following respective ranges, expressed in terms of weight percent on the oxide basis, of about 2.4-12.9% $Y_2O_3$ and 0.5-12% $Nb_2O_5+Ta_2O_5$, consisting of 0.5-7.6% $Nb_2O_5$ and/or 0.85-12% $Ta_2O_5$, to improve the nucleation of monoclinic $ZrO_2$ from a tetragonal matrix and/or the nucleation of tetragonal $ZrO_2$ as a major second phase in a third matrix material such as $Al_2O_3$, a number of rare earth oxides and MgO, CaO, and $SC_2O_3$ can perform the same function. Hence, those elements can replace yttrium in the $YNbO_4$ and/or $YTaO_4$ on a molar basis. The operable rare earth oxides include $La_2O_3$, $CeO_2$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$; with those cations exhibiting a valence of +3, the replacement of yttrium cations takes place on a one-for-one basis and for those cations having a valence of +2, three +2 cations are posited to replace two +3 yttrium cations.

It will be appreciated that, for some compositions, the niobate and/or tantalate can dominate the chemistry of a separate phase, which circumstance has been confirmed through electron microscope examination of the final sintered product, and that the partial stabilization of the $ZrO_2$ can be achieved through the presence of such known stabilizers as $Y_2O_3$, $CeO_2$, MgO, and CaO.

To illustrate, $YO_{3/2}$ in excess of that required to form 0.5-8 mole percent (~1-15% by weight) $YNbO_4$ may be included to partially stabilize the $ZrO_2$. Thus, a total of 12.9% by weight $Y_2O_3$ may be required to partially stabilize the $ZrO_2$, plus supply 14.1% by weight $YNbO_4$ for a composition like $ZrO_2$-8 mole percent $YO_{3/2}$-8 mole percent $YNbO_4$. For this composition of 14.1 weight percent $YNbO_4$, 7.6% by weight $Nb_2O_5$ would be needed.

As a second illustration, for a product consisting of $ZrO_2$-8 mole % $YO_{3/2}$-8 mole % $YTaO_4$, 12.3% by weight $Y_2O_3$ would be necessary and, due to the greater molecular weight of $Ta_2O_5$, 12.0% by weight $Ta_2O_5$ would be required.

As a third example, for a composition such as $ZrO_2$-1 mole % $YO_{3/2}$-8 mole % $YTaO_4$ about 7.3 weight % $Y_2O_3$ and 12.7 weight % $Ta_2O_5$ would be necessary.

For greater economy, MgO and/or CaO can be utilized to stabilize the $ZrO_2$. In like manner, an excess of the above-recited rare earth oxides may be employed for stabilization purposes, but the cost for so doing could be quite high.

Electron microscopy, electron diffraction, and x-ray diffraction studies of the final inventive products have indicated the presence of tetragonal $ZrO_2$, cubic $ZrO_2$, and monoclinic $ZrO_2$, as well as the second phases dominated by the niobate and/or tantalate. It will be understood that the compositions of the above phases may actually be solid solutions of varying concentrations of $ZrO_2$, $Y_2O_3$, and $Nb_2O_5$ and/or $Ta_2O_5$, with the levels of all phases and the compositions of the phases varying with the overall composition and grain size of the inventive products.

The inventive ceramic alloys are very useful in enhancing the toughness of hard, refractory ceramics. Hence, as little as 5% by volume of these alloys can impart substantially improved toughness; that is to say, the ceramic matrix may comprise up to 95% by volume of the product. Examples of such ceramic matrices include $\alpha$-alumina, $\beta$-alumina, $\beta''$-alumina, $Al_2O_3$-$Cr_2O_3$ solid solutions, mullite, sialon, nasicon, silicon carbide, silicon nitride, spinel, titanium carbide, titanium diboride, zircon, and zirconium carbide.

It should be understood that when $ZrO_2$-$YO_{3/2}$-$YNbO_4$ is present in matrix materials such as alumina at about the level of 50 volume percent or less, that the amount of $YO_{3/2}$ in the $ZrO_2$-$YNbO_4$ phase (utilized for partial stabilization) in excess of that used for forming the $YNbO_4$ can be lowered to less than 0.1 mole percent, and that these compositions can have enhanced toughness.

The inventive ceramic alloys are also effective in producing tough composite bodies containing refractory fibers and/or whiskers. In general, the fibers and/or whiskers may comprise up to about 80% by volume of the product. $Al_2O_3$, silicon oxycarbide, mullite, spinel, silicon nitride, AlN, $B_4C$, BN, $ZrO_2$, zircon, and SiC are illustrative of useful fibers and whiskers.

$HfO_2$ and $HfO_2$-$ZrO_2$ solid solutions can be partially stabilized with CaO, MgO, $Y_2O_3$, and rare earth oxides, although the tetragonal phase in these partially stabilized materials, particularly in those materials with high $HfO_2$ levels, often transforms to the monoclinic phase at room temperature. Because of those factors, $HfO_2$ and $HfO_2$-$ZrO_2$ solid solutions can be toughened and partially stabilized with $YNbO_4$ and/or $YTaO_4$ and analogs thereof in like manner to $ZrO_2$ to yield alloys of high toughness which, in turn, may be incorporated into ceramic matrices and/or bodies containing refractory fibers and/or whiskers to further improve the toughness thereof.

PRIOR ART

Figure 1:
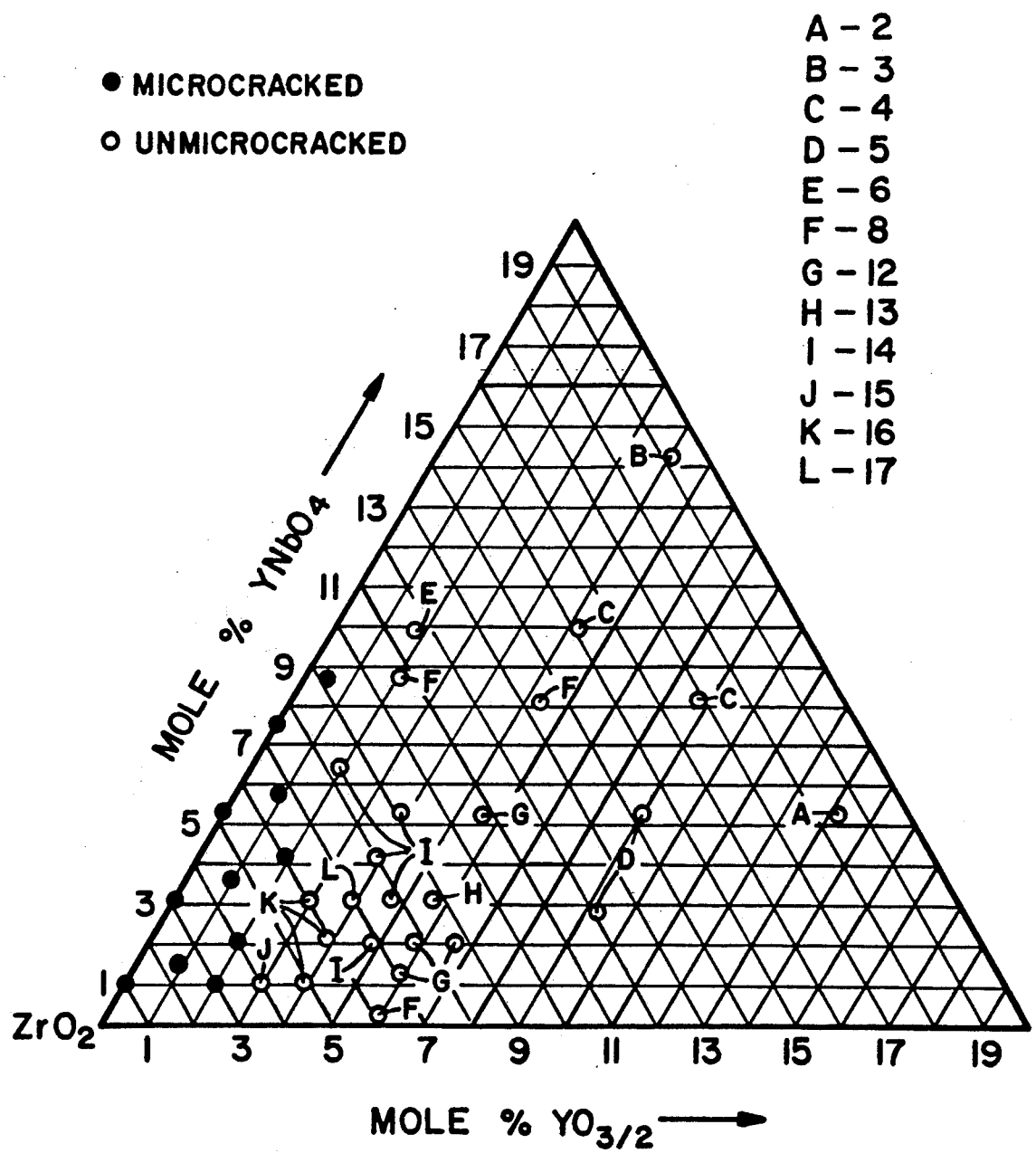
FIG. 1 graphically depicts exemplary compositions studied in this investigation to distinguish regions where microcracking of the sintered bodies is a serious problem from those where whole and intact bodies are produced. A toughness value, expressed in terms of MPa$\sqrt{m}$, measured on each intact sample is also reported.

U.S. Pat. No. 3,522,064 discusses the production of refractory bodies containing $ZrO_2$ stabilized with 5-20% by weight $CaO-Nb_2O_5$, consisting of 3-10% CaO and 2-15% $Nb_2O_5$, by firing such compositions at 1700°-2100° C.; those temperatures being much higher than the sintering temperatures employed in the present invention. X-ray diffraction analyses of the final products identified the presence of about 10-20% by weight monoclinic $ZrO_2$ and the remainder cubic $ZrO_2$. In contrast, electron microscopy, electron diffraction, and x-ray diffraction studies of the sintered products resulting from the present invention have indicated the presence of a substantial amount of the tetragonal phase of $ZrO_2$ in most compositions and at least a minor concentration of the tetragonal phase in all compositions encompassed within the present invention. In addition, electron microscope examination of the inventive products has identified the presence of a niobate and/or tantalate-rich phase for most compositions, as well as a $ZrO_2$-rich component exhibiting a tetragonal crystal structure, those circumstances providing the microstructure necessary for the transformation toughening of the inventive products.

U.S. Pat. No. 4,266,979 discloses the fabrication of an oxygen sensor ceramic consisting of a solid electrolyte of a $ZrO_2$-$Y_2O_3$ material comprising aggregates of cubic $ZrO_2$ grains having an average size of 2-10 microns and monoclinic $ZrO_2$ grains having an average size of 0.2-1 micron; the aggregates of cubic $ZrO_2$ being in contact with one another and the monoclinic $ZrO_2$ being distributed as aggregates in clearances among the aggregates of cubic $ZrO_2$.

$Nb_2O_5$ and $Ta_2O_5$ are nowhere mentioned.

U.S. Pat. No. 4,298,385 describes the production of sintered ceramic articles of high toughness. The articles consist of an isotropic matrix, e.g., $Al_2O_3$, and at least one phase of ceramic embedment material dispersed therein, e.g., $ZrO_2$, formed from a powder consisting of particles having an average size of 0.3-1.25 microns. In the preferred embodiment unstabilized $ZrO_2$ comprises the embedment material which leads to the development of microcracks in the article.

$Nb_2O_5$ and $Ta_2O_5$ are nowhere mentioned.

U.S. Pat. No. 4,316,964 is directed to the preparation of tough, strong $Al_2O_3$-$ZrO_2$ sintered ceramics by incorporating metastable grains of tetragonal $ZrO_2$ in their structure. The articles consist of 5-95% by volume tetragonal $ZrO_2$ grains having diameters <2 microns, a rare earth oxide selected from the group of $Y_2O_3$, $CeO_2$, $Er_2O_3$, and $La_2O_3$, and the remainder $Al_2O_3$.

$Nb_2O_5$ and $Ta_2O_5$ are nowhere mentioned.

U.S. Pat. No. 4,322,249 is concerned with manufacturing sintered or hot pressed ceramic articles which comprises dispersing throughout a matrix, e.g., $Al_2O_3$, SiC, or $Si_3N_4$, at least one ceramic embedment material, e.g., unstabilized $ZrO_2$ or $HfO_2$, the particles of the latter ranging about 0.1-5 microns.

$Nb_2O_5$ and $Ta_2O_5$ are nowhere mentioned.

U.S. Pat. No. 4,343,909 is drawn to ceramic compositions useful as inserts for cutting tools; the composition consisting essentially, in weight percent, of 1-15% $ZrO_2$, 5-20% $TiB_2$, 60-90% $Al_2O_3$, 0-2% MgO, and 0-10% $TiO_2$.

$Nb_2O_5$ and $Ta_2O_5$ are nowhere mentioned.

U.S. Pat. No. 4,358,516 reveals the fabrication of solid electrolytes composed of $\beta$-$Al_2O_3$, $\beta''$-$Al_2O_3$, and $Na_{1+x}Zr_2Si_xP_{3-x}O_{12}$, wherein the strength and toughness of the bodies are improved by incorporating 5-40% by volume tetragonal $ZrO_2$ having a grain size of <2 microns and containing in its structure a rare earth oxide selected from $Y_2O_3$, $CeO_2$, $Er_2O_3$, and $La_2O_3$.

$Nb_2O_5$ and $Ta_2O_5$ are nowhere mentioned.

U.S. Pat. No. 4,366,254 details the manufacture of ceramic bodies suitable for cutting tools, which bodies consist of, by volume 4-20% $ZrO_2$, 60-90% $Al_2O_3$, and 3-30% of a refractory metal compound selected from the group of carbide, nitrides, and carbonitrides of Group IVB and Group VB metals of the Periodic Table, and carbides of the Group VIB metals.

$Nb_2O_5$ and $Ta_2O_5$ are nowhere mentioned.

U.S. Pat. No. 4,396,724 cites ceramic bodies useful for cutting tools which consist of $Al_2O_3$, $ZrO_2$, and WC.

$Nb_2O_5$ and $Ta_2O_5$ are nowhere mentioned.

U.S. Pat. No. 4,360,598 provides partially-stabilized $ZrO_2$ ceramics consisting essentially of $ZrO_2$ and $Y_2O_3$ in a molar ratio $Y_2O_3$:$ZrO_2$ of about 2:98-7:93. The bodies consist of crystal grains having a mixed phase consisting essentially of tetragonal $ZrO_2$ and cubic $ZrO_2$, or having a phase consisting of tetragonal $ZrO_2$, the average size of the crystal grains being not larger than 2 microns. Whereas the patent notes the optional replacement of up to 30 mole % of the $Y_2O_3$ with CaO, MgO, or rare earth oxides such as $Yb_2O_3$, $Sc_2O_3$, $Nb_2O_3$, and $Sm_2O_3$, the only working example provided of rare earth oxide replacement involved $Yb_2O_3$. Accordingly, there is no disclosure of the remarkable effect upon the toughness of the final product having compositions within the system defined in the present invention.

U.S. Pat. No. 4,507,394 cites zirconia and/or hafnia-containing ceramics exhibiting high electrical resistivity and mechanical strength which consist essentially of 5-30 mole % of at least one component of Group A consisting of $YO_{3/2}$, $ScO_{3/2}$, $SmO_{3/2}$, $EuO_{3/2}$, $GdO_{3/2}$, $TbO_{3/2}$, $DyO_{3/2}$, $HoO_{3/2}$, $ErO_{3/2}$, $TmO_{3/2}$, $YbO_{3/2}$, $LuO_{3/2}$, CaO and MgO, 5-40 mole % of at least one component of Group B consisting of $NbO_{5/2}$ and/or $TaO_{5/2}$ and 30-90 mole % of at least one component of Group C consisting of $ZrO_2$, and $HfO_2$, said ceramics preferably satisfying the following equation,

[4-(ion valence number of each component of Group A))X(number of moles of each component of Group A)]

≦(total number of mole of components of Group B), and the crystal phase of said ceramics preferably being composed mainly of tetragonal phase.

Nowhere in this patent is the toughness of any of the ceramics measured. Although the authors of the patent claim the ceramics described by the patent have high strength, the highest flexural strength measured for these materials was 47 $Kg/mm^2$. U.S Pat. No. 4,360,598 mentioned previously describes $ZrO_2$-$Y_2O_3$ ceramics of mainly the tetragonal crystalline phase. The maximum flexural strength cited in this patent is 112 $Kg/mm^2$, over a factor of two higher than the 47 $Kg/mm^2$ strength cited in U.S. Pat. No. 4,507,394. As Syunzo Mase is an inventor for both patents it is reasonable to assume that he was aware that the ceramics described in U.S. Pat. No. 4,507,394 were dramatically inferior in strength to previous ceramics of related composition and crystal structure. The ceramics described in U.S. Pat. No. 4,507,394 are thus not remarkable in any respect other than their high electrical resistivity. As such, the high toughness materials produced by the present invention are completely unexpected and not obvious to the worker in the art. Furthermore, the formation of high toughness alloys from the combination of $ZrO_2$-$YO_{3/2}$-$YNbO_4$ and matrix materials such as $Al_2O_3$ is completely unexpected and not rendered obvious by U.S. Pat. No. 4,507,394.

DESCRIPTION OF PREFERRED EMBODIMENTS

Inasmuch as $YNbO_4$ constitutes the preferred embodiment, the bulk of the following description will be directed to that material. Likewise, $ZrO_2$ or $ZrO_2$ partially stabilized by $Y_2O_3$ comprises the preferred $ZrO_2$ and/or $HfO_2$ component.

Two general methods were employed to produce finely-divided, sinterable powders of desired compositions in the $ZrO_2$-$Y_2O_3$-$YNbO_4$ system. The first involved a coprecipitation technique, whereas the second method merely used a commercial $ZrO_2$-3 mole % $Y_2O_3$ powder as the base material which was modified through additions of yttrium in the form of $Y(NO_3)_3 \cdot 6H_2O$ and niobium in the form of $Nb(OH)_5$ and $Nb_2O_5$. In the following laboratory work, the density of $YNbO_4$ was assumed to be equivalent to that of $ZrO_2$, such that volume percent $YNbO_4$ is equal to weight percent $YNbO_4$.

Coprecipitation Method $NbCl_5$ was dissolved in aqueous HCl to form a solution that could be filtered through a 0.3-1 micron filter. Inasmuch as the solution is exposed to air, the niobium may be in form of very finely dispersed hydroxides. A concentrated aqueous solution of zirconyl nitrate and $Y(NO_3)_3 \cdot 6H_2O$ was added to the $NbCl_5$/HCl solution. High concentrations of niobium required additional HCl to prevent precipitation of niobium hydroxides and high concentrations of yttrium required additional water and a small amount of $HNO_3$ to maintain the yttrium salts in solution. Because of the large amount of heat generated during the following hydroxide precipitation reaction, the solution was divided into 100 ml portions. $NH_4OH$ is added to the portions, a large excess being used to obtain a high supersaturation and the precipitation was carried out quickly to avoid segregation of the cations. The high supersaturation produces a high nucleation rate which provides very finely-divided and intimately mixed hydroxide particles that form a gel. The precipitated gel was thereafter washed with an aqueous $NH_4OH$ solution having a pH >10 at least three times, preferably by having the gel in a centrifuge container, shaking the container for several minutes, and then separating the gel from the wash water by centrifuging. The washing is necessary to remove $NH_4Cl$ salts remaining in the gel. Water trapped in the gel was eliminated by filtering and subsequently freeze drying.

The material was thereafter calcined at 1000° C. for two hours and an isopropyl alcohol slurry of the calcine vibramilled for three days using zirconia beads. The slurry was passed through a screen to extract the beads therefrom and the powder dried. The powder was moistened slightly with isopropyl alcohol and 0.5" diameter pills uniaxially pressed at low pressure, i.e., about 1000–5000 psi, and isostatically cold pressed to 45,000 psi.

In a variation of that procedure, powder of the commercial $ZrO_2$-3 mole % $Y_2O_3$ was dispersed into methanol and an appropriate amount of $NbCl_5$ dissolved in the slurry. After shaking the slurry vigorously, $NH_4OH$ was admixed therein, the slurry again shaken vigorously, and the $ZrO_2$-3 mole % $Y_2O_3$ plus the niobium hydroxide [$Nb(OH)_5$] precipitate centrifuged. The material was washed several times with methanol containing $NH_4OH$ to maintain the pH at a high level, and the gel then separated from the wash liquid by centrifuging.

The material was thereafter calcined at 700° C. for two hours. An appropriate amount of $Y(NO_3)_3 \cdot 6H_2O$ was dissolved in methanol and the calcined powder admixed into the methanol solution. The methanol was slowly evaporated at slightly elevated temperatures while the slurry was agitated occasionally. The resultant powder was again calcined at 700° C. for two hours and the calcine pressed into pills in the manner described above. Of the compositions made by the dispersion of commercial $ZrO_2$-3 mole % $Y_2O_3$ and precipitation of niobium hydroxide from niobium chloride that are listed in Tables I, II, and III, only Examples 11 and 16 were vibramilled (for two days) to improve compositional homogeneity.

Addition Method

In this technique, $ZrO_2$-2 mole % $Y_2O_3$-4 weight % $YNbO_4$ was prepared from powdered $ZrO_2$-3 mole % $Y_2O_3$ by simply admixing a calculated amount of powdered reagent grade $Nb_2O_5$ into a slurry composed of methanol and powdered $ZrO_2$-3 mole % $Y_2O_3$, and vibramilling for 2.5 days utilizing $ZrO_2$ beads. The beads were removed by passing the slurry through a screen, the methanol slowly evaporated from the slurry, and the resultant powder calcined for two hours at 700° C.

Pills having a diameter of about 0.5" were uniaxially pressed at about 1000–5000 psi and isostatically cold pressed at 45,000 psi from the calcines of the above technique. No dispersants or binders were used in the production of the pills.

The pills prepared either via the coprecipitation method or the simple addition technique were sintered according to varying schedules. Some were fired in a vacuum furnace for two hours at temperatures from 1300°–1600° C. with an 800° C./hour heating and cooling rate, after a presintering heat treatment at 1000° C. for two hours in air with a heating and cooling rate of 100° C./hour. Others were fired in air at 1400° C. or 1450° C. for two hours with a 100° C./hour heating rate to 1000° C., a 50° C./hour heating rate to 1400° C. or 1450° C., and a 100° C./hour cooling rate.

One addition composition ($ZrO_2$-2 mole % $Y_2O_3$-4 weight % $YNbO_4$) was scaled up to specimen sizes in the form of discs about 2" in diameter and ⅛" in thickness. Three 1⅜" diameter discs were pressed at low pressure, i.e., about 1000 psi, and isostatically cold pressed to 45,000 psi.

One pressed disc was sintered in one of the following three schedules:

(a) heated in air at 50° C./hour between room temperature (R.T.~25° C.) and 150° C.; heated at 100° C./hour to 1000° C.; heated at 50° C./hour to 1420° C.; held at 1420° C. for two hours; cooled to R.T. at 100° C./hour;

(b) same heating and cooling rates in air as above but held at 1390° C. rather than 1420° C. for two hours; and (c) heated in air at 800° C. for two hours; cooled to R.T. and placed in a vacuum furnace; heated at 400° C./hour to 800° C.; heated at 800° C./hour to 1460° C.; held at 1460° C. for two hours; cooled at 800° C./hour to 800° C.; cooled at 400° C./hour to R.T.

One disc of addition-type $ZrO_2$-2 mole % $Y_2O_3$-4 weight % $YNbO_4$ having a diameter of about 2" and a cross section of about 5/16" was vacuum hot pressed for two hours at 1450° C. at a pressure of 6000 psi in a graphite mold. The heating rate was about 700° C./hour and the cooling rate about 500° C./hour. Pressure was applied between 600°-700° C. during heating and released at about 500° C. during cooling.

Table I records several compositions prepared in the course of the above-reported research. Examples 3-8 and 18 were derived via the coprecipitation process; 9-16 were produced utilizing the commercial $ZrO_2$-3 mole % $Y_2O_3$ with $NbCl_5$ and precipitating $Nb(OH)_5$ with $NH_4OH$; Example 17 involved adding $Nb_2O_5$ to commercial $ZrO_2$-3 mole % $Y_2O_3$. Table II reports the results of wet chemical analyses conducted on several Examples expressed in terms of weight percent on the oxide basis. The $HfO_2$ content represents an impurity in the $ZrO_2$ ingredient.

TABLE I

| Example | Composition |
|---|---|
| 1 | $ZrO_2$ − 2 mole % $Y_2O_3$ (commercial product) ($ZrO_2$ − 3.9 mole % $YO_{3/2}$) |
| 2 | $ZrO_2$ − 3 mole % $Y_2O_3$ (commercial product) ($ZrO_2$ − 5.8 mole % $YO_{3/2}$) |
| 3 | $ZrO_2$ − 3 mole % $Y_2O_3$ + 0.5 weight % $YNbO_4$ ($ZrO_2$ − 5.8 mole % $YO_{3/2}$ − 0.25 mole % $YNbO_4$) |
| 4 | $ZrO_2$ − 3 mole % $Y_2O_3$ + 2.5 weight % $YNbO_4$ ($ZrO_2$ − 5.8 mole % $YO_{3/2}$ − 1.26 mole % $YNbO_4$) |
| 5 | $ZrO_2$ − 3 mole % $Y_2O_3$ + 10 weight % $YNbO_4$ ($ZrO_2$ − 5.5 mole % $YO_{3/2}$ − 5.25 mole % $YNbO_4$) |
| 6 | $ZrO_2$ − 3 mole % $Y_2O_3$ + 25 weight % $YNbO_4$ ($ZrO_2$ − 5 mole % $YO_{3/2}$ − 14.3 mole % $YNbO_4$) |
| 7 | $ZrO_2$ − 3 mole % $Y_2O_3$ + 50 weight % $YNbO_4$ ($ZrO_2$ − 3.8 mole % $YO_{3/2}$ − 33.3 mole % $YNbO_4$) |
| 8 | $ZrO_2$ − 2 mole % $Y_2O_3$ + 4 weight % $YNbO_4$ ($ZrO_2$ − 3.8 mole % $YO_{3/2}$ − 2 mole % $YNbO_4$) |
| 9 | $ZrO_2$ − 3 mole % $Y_2O_3$ + 4 weight % $YNbO_4$ ($ZrO_2$ − 5.7 mole % $YO_{3/2}$ − 2 mole % $YNbO_4$) |
| 10 | $ZrO_2$ − 3 mole % $Y_2O_3$ + 6 weight % $YNbO_4$ ($ZrO_2$ − 5.6 mole % $YO_{3/2}$ − 3.1 mole % $YNbO_4$) |
| 11 | $ZrO_2$ − 1.5 mole % $Y_2O_3$ + 6 weight % $YNbO_4$ ($ZrO_2$ − 2.9 mole % $YO_{3/2}$ − 3.1 mole % $YNbO_4$) |
| 12 | $ZrO_2$ − 2 mole % $Y_2O_3$ + 6 weight % $YNbO_4$ ($ZrO_2$ − 3.8 mole % $YO_{3/2}$ − 3.1 mole % $YNbO_4$) |
| 13 | $ZrO_2$ − 2.5 mole % $Y_2O_3$ + 4 weight % $YNbO_4$ ($ZrO_2$ − 4.8 mole % $YO_{3/2}$ − 2 mole % $YNbO_4$) |
| 14 | $ZrO_2$ − 2.5 mole % $Y_2O_3$ + 6 weight % $YNbO_4$ ($ZrO_2$ − 4.7 mole % $YO_{3/2}$ − 3.1 mole % $YNbO_4$) |
| 15 | $ZrO_2$ − 3.5 mole % $Y_2O_3$ + 4 weight % $YNbO_4$ ($ZrO_2$ − 6.6 mole % $YO_{3/2}$ − 2 mole % $YNbO_4$) |
| 16 | $ZrO_2$ − 2 mole % $Y_2O_3$ + 4 weight % $YNbO_4$ ($ZrO_2$ − 3.8 mole % $YO_{3/2}$ − 2 mole % $YNbO_4$) |
| 17 | $ZrO_2$ − 2 mole % $Y_2O_3$ + 4 weight % $YNbO_4$ ($ZrO_2$ − 3.8 mole % $YO_{3/2}$ − 2 mole % $YNbO_4$) |
| 18 | $ZrO_2$ − 0.25 mole % $Y_2O_3$ + 16 weight % $YNbO_4$ ($ZrO_2$ − 0.5 mole % $YO_{3/2}$ − 8.7 mole % $YNbO_4$) |
| 19 | $YNbO_4$ |

TABLE II

|  | 1 | 2 | 3 | 4 | 5 | 7 | 8 | 9 |
|---|---|---|---|---|---|---|---|---|
| $ZrO_2$ | 9.41 | 92.8 | 92.2 | 90.6 | 83.9 | 48.4 | 90.3 | 89.0 |
| $HfO_2$ | 2.2 | 2.2 | 1.6 | 1.6 | 1.5 | 0.8 | 1.8 | 2.1 |
| $Y_2O_3$ | 3.5 | 5.1 | 5.7 | 6.4 | 9.3 | 26.3 | 5.4 | 6.6 |
| $Nb_2O_5$ | — | — | 0.4 | 1.4 | 5.4 | 24.4 | 2.2 | 2.3 |
|  | 10 | 11 | 12 | 13 | 14 | 15 | 16 | 18 |
| $ZrO_2$ | 87.3 | 89.6 | 88.9 | 90.0 | 88.2 | 88.4 | 90.6 | 83.2 |
| $HfO_2$ | 2.0 | 2.1 | 2.1 | 2.1 | 2.1 | 2.1 | 2.1 | 1.5 |
| $Y_2O_3$ | 7.4 | 5.1 | 5.8 | 5.8 | 6.6 | 7.4 | 5.1 | 7.3 |
| $Nb_2O_5$ | 3.3 | 3.3 | 3.2 | 2.1 | 3.2 | 2.2 | 2.2 | 8.1 |

Table III lists the temperatures at which the compositions of Table I were sintered for two hours, along with Vickers hardness measurements (GPa) made on the sintered samples and fracture toughness ($K_{IC}$) values calculated from the equation below expressed in terms of MPa$\sqrt{m}$. A Young's modulus of 200 GPa was assumed for the calculation.

$$K_{IC} = 0.016(E^{1/2}P^{1/2}dC^{-1.5})$$

wherein
E = 200 GPa; P = load at 5, 10, 30, or 50 kg; d = indent diagonal; C = crack length from center of indent impression; H = Hardness; and $$H = \frac{1.854P}{d^2}$$

The sintered specimens were ground and polished and microhardness testing undertaken utilizing 5, 10, 30, and 50 kilogram loads. In Table III all of the measurements were made employing a 10 kilogram load, except those samples marked with one asterisk where a 30 kilogram load was used, two asterisks where a 50 kilogram load was used, and $YNbO_4$ where a 5 kilogram load was used.

TABLE III

| Example | Sintering Temperature | Vickers Hardness | $K_{IC}$ |
|---|---|---|---|
| 1 | 1300° C. | 11.8 | 15.2 |
|  | 1400° C. | 11.6 | 11.6 |
|  | 1450° C. | 12.2 | 14.1 |
|  | 1500° C. | 11.3 | 14.4 |
|  | 1550° C. | 10.9 | 17.0 |
| 1 | 1450° C.* | 11.1 | 10.5 |
|  | 1500° C.* | 11.0 | 12.1 |
|  | 1550° C.* | 11.0 | 13.2 |
| 1 | 1450° C.** | 11.8 | 7.4 |
|  | 1500° C.** | 11.5 | 6.2 |
|  | 1550° C.** | 11.2 | 9.4 |
| 2 | 1450° C. | 12.2 | 4.5 |
|  | 1460° C. | 11.6 | 5.1 |
|  | 1500° C. | 11.6 | 4.9 |
|  | 1550° C. | 11.6 | 6.4 |
|  | 1600° C. | 11.6 | 5.9 |
| 3 | 1400° C. | 11.1 | 4.8 |
|  | 1460° C. | 11.3 | 4.6 |
|  | 1600° C. | 10.3 | 8.0 |
|  | 1600° C.* | 10.5 | 5.4 |
| 4 | 1400° C. | 10.0 | 5.6 |
|  | 1450° C. | 9.3 | 6.6 |
|  | 1460° C. | 9.1 | 9.5 |
|  | 1500° C. | 8.4 | 9.5 |
|  | 1550° C. | 8.2 | 11.8 |
|  | 1600° C. | 6.5 | 5.4 |
| 5 | 1400° C. | 10.5 | 5.0 |
|  | 1450° C. | 9.8 | 8.3 |
|  | 1460° C. | 9.1 | 11.9 |
|  | 1500° C. | 8.4 | 11.8 |
|  | 1550° C. | 8.4 | 11.0 |
|  | 1600° C. | 10.1 | 7.2 |
| 6 | 1400° C. | 10.1 | 2.2 |
|  | 1450° C. | 9.8 | 2.5 |
|  | 1500° C. | 9.3 | 2.5 |
|  | 1600° C. | 6.9 | 2.6 |
| 7 | 1400° C. | 9.1 | 1.9 |
|  | 1460° C. | 9.2 | <2.1 |
|  | 1600° C. | 9.4 | 2.4 |

TABLE III-continued

| Example | Sintering Temperature | Vickers Hardness | $K_{IC}$ |
|---|---|---|---|
| 8 | 1400° C. | 10.1 | 14.1 |
|  | 1460° C. | 9.8 | 16.0 |
|  | 1460° C.* | 9.2 | 16.0 |
|  | 1600° C. | 11.6 | 3.7 |
| 9 | 1450° C. | 11.1 | 6.3 |
|  | 1460° C. | 10.9 | 12.4 |
|  | 1500° C. | 11.1 | 9.0 |
|  | 1550° C. | 10.4 | 12.3 |
|  | 1600° C. | 10.4 | 10.4 |
| 10 | 1450° C. | 10.4 | 7.7 |
|  | 1460° C. | 10.1 | 11.7 |
|  | 1500° C. | 10.4 | 12.5 |
|  | 1550° C. | 10.2 | 11.6 |
|  | 1600° C. | 8.2 | 1.4 |
| 11 | 1300° C. | 9.3 | 10.3 |
|  | 1400° C. | 9.3 | 15.7 |
|  | 1450° C. | 9.6 | 15.2 |
|  | 1500° C. | 8.4 | 5.5 |
|  | 1550° C. | 8.4 | 6.3 |
| 12 | 1450° C. | 9.8 | 15.5 |
|  | 1460° C. | 9.3 | 16.5 |
|  | 1500° C. | 9.4 | 15.3 |
|  | 1550° C. | 9.8 | 13.9 |
|  | 1600° C. | 7.6 | 3.3 |
| 13 | 1450° C. | 11.0 | 9.2 |
|  | 1460° C. | 9.8 | 13.6 |
|  | 1500° C. | 10.8 | 11.7 |
|  | 1550° C. | 10.2 | 11.8 |
|  | 1600° C. | 9.1 | 3.5 |
| 14 | 1450° C. | 10.4 | 13.7 |
|  | 1460° C. | 9.8 | 13.6 |
|  | 1500° C. | 10.5 | 14.2 |
|  | 1550° C. | 9.8 | 12.7 |
|  | 1600° C. | 5.7 | 1.4 |
| 15 | 1450° C. | 11.3 | 5.0 |
|  | 1460° C. | 9.6 | 10.2 |
|  | 1500° C. | 11.0 | 7.0 |
|  | 1550° C. | 9.8 | 11.7 |
|  | 1600° C. | 10.5 | 11.7 |
| 16 | 1450° C. | 10.4 | 16.2 |
|  | 1500° C. | 10.4 | 15.3 |
|  | 1550° C. | 10.1 | 14.7 |
|  | 1600° C. | 9.8 | 16.1 |
| 16 | 1450° C.* | 10.5 | 15.0 |
|  | 1500° C.* | 10.1 | 16.8 |
|  | 1550° C.* | 10.1 | 17.5 |
| 16 | 1450° C.** | 11.2 | 14.9 |
|  | 1500° C.** | 10.8 | 16.0 |
|  | 1550° C.** | 10.5 | 18.5 |
| 17 | 1390° C. (air) | — | >14.0 |
|  | 1420° C. (air) | — | >14.0 |
|  | 1460° C. (vacuum) | 9.8 | 15.4 |
|  | 1450° C. (hot pressed) | — | >14.0 |
| 18 | 1400° C. | Microcracked |  |
|  | 1460° C. | Microcracked |  |
|  | 1600° C. | Microcracked |  |
| 19 | >1600° C. | 3.5 | 2.2 |

All of the specimens sintered to closed porosity and, when examined by optical microscopy, appeared to have densities greater than about 97% of theoretical. Large areas in most samples appeared to have a density of 100% of theoretical, but frequently there were large pore clusters. Grain sizes ranged from less than 0.5 micron to over 2 microns. The microstructure of the samples prepared via the coprecipitating process and those prepared by precipitating the commercial $ZrO_2$-3 mole % $Y_2O_3$ with $NH_4OH$, plus milling after calcination, appeared to be uniform in overall composition and grain size.

A comparison of Examples 1 and 16 is of particular interest. As can be observed, the toughness of Example 1 ($ZrO_2$-2 mole % $Y_2O_3$) decreases as the indentation load increases. In contrast, the measured toughness of Example 16 ($ZrO_2$-2 mole % $Y_2O_3$ + 4 weight % $YNbO_4$) remains essentially constant as the indentation load is increased. Such behavior is believed to underscore the finding that additions of $YNbO_4$ can substantially improve the toughness of $ZrO_2$-$Y_2O_3$ compositions.

A comparison of Example 2 with Examples 3-5, 9, and 10 illustrates the significant enhancement in toughness which the inclusion of $YNbO_4$ will endow to the base $ZrO_2$-3 mole % $Y_2O_3$ body. Examples 6 and 7 indicate, however, that additions of $YNbO_4$ must be held below 20% by weight to enjoy the improvement in toughness.

Example 18 illustrates that at extremely low levels of $Y_2O_3$, even with additions of $YNbO_4$, the tetragonal phase can transform to the monoclinic phase upon cooling from the sintering temperature, thereby resulting in a microcracked body.

Specimens of Examples 3, 7, and 8, sintered at 1400° C., 1460° C., or 1600° C. for two hours, and of Examples 4 and 5, sintered at 1400° C. and 1600° C. for two hours, were polished etched in $NH_4F.HF$, and then examined by scanning electron microscopy. A major crystal phase and a minor crystal phase were observed, the latter being more easily etched and of larger grain size than the major phase. The apparent area proportion of this second phase increases with increases in $YNbO_4$ and $Y_2O_3$ concentrations, and with increases in sintering temperature. Inasmuch as the ammonium bifluoride etches the cubic phase of $ZrO_2$, which phase is higher in stabilizer ($Y_2O_3$) content, more rapidly than the tetragonal phase of $ZrO_2$, the latter phase containing a lower content of stabilizer, it is conjectured that this phase of larger grain size in the $ZrO_2$-$Y_2O_3$-$YNbO_4$ materials has a high concentration of $Y_2O_3$ and is cubic, while the finer grain size phase is tetragonal.

Several conclusions can be drawn from the above laboratory data. First, whereas sintered bodies of $ZrO_2$-3 mole % $Y_2O_3$ may demonstrate fracture toughness values somewhat greater than $6 MPa\sqrt{m}$ and bodies of sintered $YNbO_4$ display fracture toughness values in the vicinity of $2 MPa\sqrt{m}$, sintered bodies consisting of a combination of those components can exhibit fracture toughness levels in excess of $12.5 MPa\sqrt{m}$. In compositions with lower levels of $Y_2O_3$, i.e., at or below $ZrO_2$-2 mole % $Y_2O_3$ with $YNbO_4$ additions, fracture toughness values can exceed $15 MPa\sqrt{m}$. Second, the inclusion of $YNbO_4$ in an amount equivalent to the addition of 0.5% by weight $YNbO_4$ to $ZrO_2$-3 mole % $Y_2O_3$ is not adequate to exert any appreciable effect upon the properties manifested by sintered $ZrO_2$-$Y_2O_3$ bodies. Third, the incorporation of $YNbO_4$ in an amount equivalent to the addition of 25% by weight to $ZrO_2$-3 mole % $Y_2O_3$ impacts very deleteriously upon the toughness illustrated by sintered bodies of $ZrO_2$-$Y_2O_3$.

Table IV reports another group of compositions prepared in the course of the above-discussed research; the compositions involving the $ZrO_2$-$Y_2O_3$ system with and without additions of $YNbO_4$. Each sample was prepared employing the ammonium hydroxide precipitation procedure described above, utilizing commercially available powders of $ZrO_2$, $ZrO_2$-2 mole % $Y_2O_3$, $ZrO_2$-2.5 mole % $Y_2O_3$, $ZrO_2$-3 mole % $Y_2O_3$, or $ZrO_2$-6 mole % $Y_2O_3$ with the exception of Example 20. All of these precipitated formulations were vibramilled for two days. In Example 20 $Nb_2O_5$ was added to commercial $ZrO_2$ powder and vibramilled for two days. The $ZrO_2$-2.5 mole % $Y_2O_3$ of Example 21 is a commercial product.

TABLE IV

| Example | Composition |
|---|---|
| 20 | $ZrO_2$ — 2.5 weight % $Nb_2O_5$ |
|  | ($ZrO_2$ — 2.3 mole % $NbO_{5/2}$) |
| 21 | $ZrO_2$ — 2.5 mole % $Y_2O_3$ (commercial product) |
|  | ($ZrO_2$ — 4.9 mole % $YO_{3/2}$) |
| 22 | $ZrO_2$ — 5 mole % $Y_2O_3$ |
|  | ($ZrO_2$ — 9.5 mole % $YO_{3/2}$) |
| 23 | $ZrO_2$ — 7.5 mole % $Y_2O_3$ |
|  | ($ZrO_2$ — 14 mole % $YO_{3/2}$) |
| 24 | $ZrO_2$ — 1 mole % $Y_2O_3$ + 12 weight % $YNbO_4$ |
|  | ($ZrO_2$ — 1.9 mole % $YO_{3/2}$ — 6.4 mole % $YNbO_4$) |
| 25 | $ZrO_2$ — 2 mole % $Y_2O_3$ + 8 weight % $YNbO_4$ |
|  | ($ZrO_2$ — 3.8 mole % $YO_{3/2}$ — 4.2 mole % $YNbO_4$) |
| 26 | $ZrO_2$ — 2 mole % $Y_2O_3$ + 10 weight % $YNbO_4$ |
|  | ($ZrO_2$ — 3.7 mole % $YO_{3/2}$ — 5.3 mole % $YNbO_4$) |
| 27 | $ZrO_2$ — 3 mole % $Y_2O_3$ + 15 weight % $YNbO_4$ |
|  | ($ZrO_2$ — 5.4 mole % $YO_{3/2}$ — 8.1 mole % $YNbO_4$) |
| 28 | $ZrO_2$ — 5 mole % $Y_2O_3$ + 5 weight % $YNbO_4$ |
|  | ($ZrO_2$ — 9.3 mole % $YO_{3/2}$ — 2.6 mole % $YNbO_4$) |
| 29 | $ZrO_2$ — 5 mole % $Y_2O_3$ + 10 weight % $YNbO_4$ |
|  | ($ZrO_2$ — 9 mole % $YO_{3/2}$ — 5.2 mole % $YNbO_4$) |
| 30 | $ZrO_2$ — 5 mole % $Y_2O_3$ + 15 weight % $YNbO_4$ |
|  | ($ZrO_2$ — 8.8 mole % $YO_{3/2}$ — 8.1 mole % $YNbO_4$) |
| 31 | $ZrO_2$ — 7.5 mole % $Y_2O_3$ + 10 weight % $YNbO_4$ |
|  | ($ZrO_2$ — 13.2 mole % $YO_{3/2}$ — 5.2 mole % $YNbO_4$) |
| 32 | $ZrO_2$ + 2 weight % $YNbO_4$ |
|  | ($ZrO_2$ — 1 mole % $YNbO_4$) |
| 33 | $ZrO_2$ + 6 weight % $YNbO_4$ |
|  | ($ZrO_2$ — 3.1 mole % $YNbO_4$) |
| 34 | $ZrO_2$ + 10 weight % $YNbO_4$ |
|  | ($ZrO_2$ — 5.3 mole % $YNbO_4$) |
| 35 | $ZrO_2$ + 14 weight % $YNbO_4$ |
|  | ($ZrO_2$ — 7.5 mole % $YNbO_4$) |
| 36 | $ZrO_2$ — 0.5 mole % $Y_2O_3$ + 3 weight % $YNbO_4$ |
|  | ($ZrO_2$ — 1 mole % $YO_{3/2}$ — 1.5 mole % $YNbO_4$) |
| 37 | $ZrO_2$ — 0.5 mole % $Y_2O_3$ + 7 weight % $YNbO_4$ |
|  | ($ZrO_2$ — 1 mole % $YO_{3/2}$ — 3.6 mole % $YNbO_4$) |
| 38 | $ZrO_2$ — 0.5 mole % $Y_2O_3$ + 11 weight % $YNbO_4$ |
|  | ($ZrO_2$ — 0.9 mole % $YO_{3/2}$ — 5.8 mole % $YNbO_4$) |
| 39 | $ZrO_2$ — 1 mole % $Y_2O_3$ + 2 weight % $YNbO_4$ |
|  | ($ZrO_2$ — 2 mole % $YO_{3/2}$ — 1 mole % $YNbO_4$) |
| 40 | $ZrO_2$ — 1 mole % $Y_2O_3$ + 4 weight % $YNbO_4$ |
|  | ($ZrO_2$ — 1.9 mole % $YO_{3/2}$ — 2 mole % $YNbO_4$) |
| 41 | $ZrO_2$ — 1 mole % $Y_2O_3$ + 8 weight % $YNbO_4$ |
|  | ($ZrO_2$ — 1.9 mole % $YO_{3/2}$ — 4.2 mole % $YNbO_4$) |
| 42 | $ZrO_2$ — 1 mole % $Y_2O_3$ + 18 weight % $YNbO_4$ |
|  | ($ZrO_2$ — 1.8 mole % $YO_{3/2}$ — 9.9 mole % $YNbO_4$) |
| 43 | $ZrO_2$ — 1.5 mole % $Y_2O_3$ + 2 weight % $YNbO_4$ |
|  | ($ZrO_2$ — 2.9 mole % $YO_{3/2}$ — 1 mole % $YNbO_4$) |
| 44 | $ZrO_2$ — 2 mole % $Y_2O_3$ + 2 weight % $YNbO_4$ |
|  | ($ZrO_2$ — 3.9 mole % $YO_{3/2}$ — 1 mole % $YNbO_4$) |
| 45 | $ZrO_2$ — 3 mole % $Y_2O_3$ + 18 weight % $YNbO_4$ |
|  | ($ZrO_2$ — 5.2 mole % $YO_{3/2}$ — 9.9 mole % $YNbO_4$) |
| 46 | $ZrO_2$ — 1.1 mole % $Y_2O_3$ + 16 weight % $YNbO_4$ |
|  | ($ZrO_2$ — 2 mole % $YO_{3/2}$ — 8.7 mole % $YNbO_4$) |
|  | ($ZrO_2$ — 10 mole % $YO_{3/2}$ — 8 mole % $NbO_{5/2}$) |

Pills having a diameter of about 0.5" were pressed and sintered in the manner described above. Each sample was sintered for two hours in a vacuum at the temperatures recorded in Table V employing heating and cooling rates of 800° C./hour. Vickers hardness measurements (GPa) and fracture toughness values ($K_{IC}$) calculated in terms of MPa√m were derived utilizing a 10 kg load except for those samples identified with an asterisk where a 5 kg load was used.

TABLE V

| Example | Sintering Temperature | Vickers Hardness | $K_{IC}$ |
|---|---|---|---|
| 20 | 1400° C. | Microcracked |  |
|  | 1500° C. | Microcracked |  |
|  | 1600° C. | Microcracked |  |
| 21 | 1300° C. | 12.4 | 5.2 |
|  | 1400° C. | 12.0 | 5.0 |
|  | 1450° C. | 11.8 | 5.1 |
|  | 1500° C. | 11.8 | 5.1 |
|  | 1550° C. | 11.6 | 5.8 |
|  | 1600° C. | 11.0 | 7.4 |
| 22 | 1400° C. | 12.4 | 2.9 |
|  | 1500° C. | 12.0 | 3.4 |
|  | 1600° C. | 14.0 | 3.9 |
| 23 | 1400° C. | 11.6 | 2.0 |
|  | 1500° C. | 11.9 | 2.2 |
|  | 1600° C.* | 12.2 | 1.9 |
| 24 | 1400° C. | 8.4 | 13.9 |
|  | 1450° C. | 8.4 | 13.9 |
|  | 1500° C. | 8.4 | 13.9 |
|  | 1550° C. | 8.4 | 13.2 |
|  | 1600° C. | Microcracked |  |
| 25 | 1300° C. | 10.4 | 5.5 |
|  | 1400° C. | 10.3 | 10.9 |
|  | 1450° C. | 9.8 | 14.1 |
|  | 1500° C. | 10.1 | 13.9 |
|  | 1550° C. | 8.4 | 7.7 |
|  | 1600° C. | Microcracked |  |
| 26 | 1300° C. | 8.4 | 5.3 |
|  | 1400° C. | 10.1 | 7.8 |
|  | 1450° C. | 9.9 | 12.6 |
|  | 1500° C. | 9.5 | 13.8 |
|  | 1550° C. | 8.2 | 5.0 |
|  | 1600° C. | Microcracked |  |
| 27 | 1400° C. | 11.8 | 5.2 |
|  | 1500° C. | 9.8 | 7.2 |
|  | 1600° C. | 8.5 | 8.2 |
| 28 | 1400° C. | 12.4 | 3.7 |
|  | 1500° C. | 11.6 | 4.3 |
|  | 1600° C. | 11.0 | 4.5 |
| 29 | 1400° C. | 11.6 | 3.5 |
|  | 1500° C. | 10.6 | 4.3 |
|  | 1600° C. | 11.6 | 4.7 |
| 30 | 1400° C.* | 10.7 | 2.6 |
|  | 1500° C. | 10.4 | 3.2 |
|  | 1600° C. | 10.4 | 3.7 |
| 31 | 1400° C. | 11.3 | 2.3 |
|  | 1500° C. | 12.4 | 2.1 |
|  | 1600° C.* | 11.4 | 2.0 |
| 32 | 1300° C. | Microcracked |  |
|  | 1400° C. | " |  |
|  | 1500° C. | " |  |
|  | 1600° C. | " |  |
| 33 | 1300° C. | Microcracked |  |
|  | 1400° C. | " |  |
|  | 1500° C. | " |  |
|  | 1600° C. | " |  |
| 34 | 1300° C. | Microcracked |  |
|  | 1400° C. | " |  |
|  | 1500° C. | " |  |
|  | 1600° C. | " |  |
| 35 | 1300° C. | Microcracked |  |
|  | 1400° C. | " |  |
|  | 1500° C. | " |  |
|  | 1600° C. | " |  |
| 36 | 1300° C. | Microcracked |  |
|  | 1400° C. | " |  |
|  | 1500° C. | " |  |
|  | 1600° C. | " |  |
| 37 | 1300° C. | Microcracked |  |
|  | 1400° C. | " |  |
|  | 1500° C. | " |  |
|  | 1600° C. | " |  |
| 38 | 1300° C. | Microcracked |  |
|  | 1400° C. | " |  |
|  | 1500° C. | " |  |
|  | 1600° C. | " |  |
| 39 | 1300° C. | Microcracked |  |
|  | 1400° C. | " |  |
|  | 1500° C. | " |  |
|  | 1600° C. | " |  |
| 40 | 1300° C. | Microcracked |  |
|  | 1400° C. | " |  |
|  | 1500° C. | " |  |
|  | 1600° C. | " |  |
| 41 | 1300° C. | Microcracked |  |
|  | 1400° C. | " |  |
|  | 1500° C. | " |  |
|  | 1600° C. | " |  |
| 42 | 1300° C. | 8.4 | 4.9 |

TABLE V-continued

| Example | Sintering Temperature | Vickers Hardness | $K_{IC}$ |
|---|---|---|---|
|  | 1400° C. | 9.8 | 4.9 |
|  | 1500° C. | 9.1 | 5.6 |
|  | 1600° C. | 9.1 | 6.4 |
| 43 | 1300° C. | 10.1 | 15.4 |
|  | 1400° C. | 9.4 | 9.0 |
|  | 1500° C. | 9.3 | 5.3 |
|  | 1600° C. | Microcracked |  |
| 44 | 1300° C. | 12.4 | 8.9 |
|  | 1400° C. | 11.6 | 12.6 |
|  | 1500° C. | 10.8 | 15.7 |
|  | 1600° C. | 10.4 | 15.1 |
| 45 | 1300° C. | 9.8 | 2.8 |
|  | 1400° C. | 10.9 | 2.9 |
|  | 1500° C. | 10.4 | 3.6 |
|  | 1600° C. | 10.4 | 4.0 |
| 46 | 1300° C. | 8.9 | 4.9 |
|  | 1400° C. | 9.8 | 5.2 |
|  | 1500° C. | 9.3 | 7.2 |
|  | 1600° C. | 9.1 | 8.1 |

Several conclusions can be drawn through an examination of the above data:

First, examples 32-41 prove that some excess $Y_2O_3$ (greater than 1 mole percent) is needed to form bodies that are whole and free from microcracks when the amount of $YNbO_4$ additions is less than or equal to 10 weight percent. Examples 24, 42 and 46 prove that, when a large amount of $YNbO_4$ (about 12 weight % or greater) is added to $ZrO_2$-1 mole % $Y_2O_3$, then whole and unmicrocracked bodies are obtained. This is in contrast to binary $ZrO_2$-$Y_2O_3$ compositions which require about 2 mole % $Y_2O_3$ to prevent microcracking during cooling from the sintering temperature. Thus, in addition to enhancing the toughness of the transformation toughened $ZrO_2$-$Y_2O_3$ compositions known to the art (~2-7 mole % $Y_2O_3$), this inclusion of small amounts of $YNbO_4$ imparts a partial stabilizing effect. That phenomenon can eliminate the need for some excess $Y_2O_3$ to perform the same function, if desired.

Second, whereas additions of $YNbO_4$ to $ZrO_2$-$Y_2O_3$ compositions wherein the $Y_2O_3$ content is not more than about 5 mole % can improve the toughness thereof, at higher levels of $Y_2O_3$, i.e., about 7.5 mole % $Y_2O_3$, such additions do not appear to impart any enhancement of toughness. That latter circumstance is believed to be due to the fact that the composition produces an essentially cubic structure, i.e., there is a lack of tetragonal $ZrO_2$ in the product. That situation is evidenced by Example 31 wherein 10% by weight $YNbO_4$ was added to $ZrO_2$-7.5 mole % $Y_2O_3$.

Third, the addition of $Nb_2O_5$ alone to undoped $ZrO_2$ (Example 20) yielded heavily microcracked bodies having essentially a monoclinic structure. Accordingly, additions of $Nb_2O_5$ alone to $ZrO_2$ do not provide enhanced toughness.

FIG. 1 illustrates the composition ranges where compositions examined in this work produced microcracked bodies or whole and intact bodies after sintering in the temperature ranges previously noted. FIG. 1 illustrates the highest toughness measured for a particular composition. Toughness values ($K_{IC}$) for the given compositions which did not microcrack, expressed in terms of MPa$\sqrt{m}$ rounded to the nearest whole number, are reported below in tabular form.

| Composition | $K_{IC}$ | Composition | $K_{IC}$ | Composition | $K_{IC}$ |
|---|---|---|---|---|---|
| A | 2 | E | 6 | I | 14 |
| B | 3 | F | 8 | J | 15 |
| C | 4 | G | 9 | K | 16 |
| D | 5 | H | 10 | L | 17 |

It can be seen that the highest toughness materials, greater than 8.5 MPa$\sqrt{m}$, have additions of greater than 0.25 mole % $YNbO_4$ (0.5 weight %) and additions of less than about 8 mole % $YNbO_4$ (less than about 15 weight %). High toughnesses are only encountered at less than about 9 mole % $YO_{3/2}$ (less than 4.7 mole % $Y_2O_3$) regardless of any $YNbO_4$ addition. I believe this last phenomenon to be a result of a significant amount of cubic phase and too little tetragonal phase that transforms to monoclinic.

In view of the data presented in Tables I-V and FIG. 1, a minimum of $YNbO_4$ in an amount equivalent to the inclusion of 0.5 mole % (1 percent by weight) to $ZrO_2$-2.2 to 9 mole % $YO_{3/2}$ (about 1.1 to 4.7 mole % $Y_2O_3$) has been deemed necessary to significantly enhance the toughness of the resulting products, and $YNbO_4$ in an amount equivalent to the incorporation of less than about 8 mole % (about 15% by weight) to $ZrO_2$-about 0.8 to 8 mole % $YO_{3/2}$ (about 0.4 to 4.5 mole % $Y_2O_3$) has been considered to comprise a preferred maximum. Note that as the amount of $YNbO_4$ is increased, the amount of excess $YO_{3/2}$ can be reduced. The preferred practice contemplates the use of $YNbO_4$ in amounts equivalent to the addition of about 3-10% by weight $YNbO_4$ (about 1.5 to 5 mole %) to $ZrO_2$-about 1 to 3 mole % $Y_2O_3$ (about 2 to 6 mole % $YO_{3/2}$) to promote a substantial enhancement in toughness.

Mase et al., U.S. Pat. No. 4,507,394, describe zirconia, niobia (tantala), and yttria (rare earth oxide) compositions that have high electrical resistivity. Four compositions that they examined are given in Table VI. I also examined these compositions according to the descriptions given in columns 5,6,7,8 and 10 of U.S. Pat. No. 4,507,394.

TABLE VI

| Sample No. | Composition |
|---|---|
| 1' | $ZrO_2$ − 5 mole % $YO_{3/2}$ − 5 mole % $TaO_{5/2}$ ($ZrO_2$ − 5.25 mole % $YTaO_4$) |
| 2' | $ZrO_2$ − 6 mole % $YO_{3/2}$ − 7 mole % $NbO_{5/2}$ ($ZrO_2$ − 1.1 mole % $NbO_{5/2}$ − 6.4 mole % $YNbO_4$) + 3 weight % $Al_2O_3$ |
| 3' | $ZrO_2$ − 10 mole % $YO_{3/2}$ − 8 mole % $TaO_{5/2}$ ($ZrO_2$ − 2 mole % $YO_{3/2}$ − 8.7 mole % $YTaO_4$) |
| 22' | $ZrO_2$ − 10 mole % $EuO_{3/2}$ − 11 mole % $NbO_{5/2}$ ($ZrO_2$ − 1.1 mole % $NbO_{5/2}$ − 11 mole % $EuNbO_4$) |

Note: the prime (') designation is utilized to denote the Mase et al. compositions (allowing easy comparison to Mase et al., U.S. Pat. No. 4,507,394), while differentiating the above four compositions from the majority of compositions examined in this work.

The same commercial $ZrO_2$ powder with no $Y_2O_3$ additive that was used for the previous samples was also used here. Commercial $Ta_2O_5$, $Nb_2O_5$, $Al_2O_3$, Y(NO$_3$)$_3$-6H$_2$O and Eu(NO$_3$)$_3$-6H$_2$O were used. The $ZrO_2$, the $Nb_2O_5$ or $Ta_2O_5$, and the Y(NO$_3$)$_3$-6H$_2$O or Eu(NO$_3$)$_3$-6H$_2$O were mixed by a wet process and the mixture was thoroughly dried. The mixture was calcined at 800° C. For sample number 2' the Al$_2$O$_3$ sintering aid was then added. The four compositions were then subjected to dry pulverization with 0.5% by weight of polyethyleneglycol stearate for 20–200 hours. The resulting powder was press molded and then fired at 1325° C. in air for two hours. Other samples were press molded, prefired in air at 1000° C., and then fired in vacuum at 1325° C. for two hours.

The samples were examined by optical microscopy and the one composition that did not microcrack was polished and the fracture toughness measured by the same procedure used for the previous samples of Table I–V. Table VII reports the results.

TABLE VII

| Sample No. | Sintering Temperature | Sintering Atmosphere | H GPa | K$_{IC}$ MPa$\sqrt{m}$ |
|---|---|---|---|---|
| 1' | 1325° C. | Air | | Microcracked |
| | 1325° C. | Vacuum | | Microcracked |
| 2' | 1325° C. | Air | | Microcracked |
| | 1325° C. | Vacuum | | Microcracked |
| 3' | 1325° C. | Air | 7.3 | 8.1 |
| | 1325° C. | Vacuum | 7.3 | 7.3 |
| 22' | 1325° C. | Air | | Microcracked |
| | 1325° C. | Vacuum | | Microcracked |

Table VII illustrates that only one of these four compositions examined by Mase et al. did not microcrack when made to their description. The microcracking of compositions 1', 2', and 22' is consistent with the microcracking of compositions containing little or no excess yttria (0 to 0.5 mole % YO$_{3/2}$) reported in Tables I–V. The composition that did not microcrack, 3', did not have exceptional toughness, 8.1 MPa$\sqrt{m}$ and had a hardness, 7.3 GPa, inferior to that of all the ceramics described in Tables I–V that did not microcrack, with the exception of YNbO$_4$, Example 19. Of particular interest is the composition of Example 46 in Tables IV and V. This composition is the same as that of 3' of Tables VI and VII with the Ta$_2$O$_5$ replaced by Nb$_2$O$_5$. Example 46 had a maximum toughness of only 8.1 MPa$\sqrt{m}$, which is unexceptional when compared to the toughnesses of 11.7 MPa$\sqrt{m}$ to 18.5 MPa$\sqrt{m}$ found in a variety of compositions with additions of smaller amounts of YNbO$_4$ to ZrO$_2$-Y$_2$O$_3$ ceramics examined in the present work.

A comparison of all the compositions examined by Mase et al. with the data of Table I–VII indicates that, with the exception of composition 3', the materials should have extremely low toughnesses, below about 5 MPa$\sqrt{m}$, or should microcrack. As mentioned above, the toughness of 8.1 MPa$\sqrt{m}$ or less attained by composition 3' and its niobia analog, Example 46, is unremarkable in the context of the toughnesses attained by compositions with additions of smaller amounts of YNbO$_4$ to ZrO$_2$-Y$_2$O$_3$ ceramic alloys.

Analogs to Yttrium Niobate

To investigate the utility of compounds other than YNbO$_4$ for enhancing the toughness of zirconia-containing bodies, the several compositions (in volume percent and molar percent) recited in Table VIII were formulated. The compositions involved the partial or total substitution of yttrium with an element demonstrating the valence of yttrium and the partial or total substitution of niobium with an element demonstrating the valence of niobium. The resulting compounds exhibited a structure and refractoriness similar to YNbO$_4$. [For the purpose of these experiments, the molar volumes of these rare earth niobates and/or tantalates were assumed to be equivalent to twice the molar volume of ZrO$_2$. Hence, for example, 5% by volume LaNbO$_4$ in ZrO$_2$ equals 2.5 mole % LaNbO$_4$ in ZrO$_2$.]

Each sample was prepared employing the ammonium hydroxide precipitation technique outlined above. Pill specimens having a diameter of about 0.5" were pressed and sintered also in the manner described above. Each sample was sintered for two hours at the temperatures recorded in Table VIII. Vickers hardness measurements (GPa) and fracture toughness values (K$_{IC}$) calculated in terms of MPa$\sqrt{m}$ were derived using a 10 kg load.

TABLE VIII

| Example | Composition | Sintering Temperature | GPa | K$_{IC}$ |
|---|---|---|---|---|
| 47 | 90% (ZrO$_2$ − 3 mole % Y$_2$O$_3$) + 10% YTaO$_4$) | 1300° C. | 10.6 | 4.5 |
| | | 1400° C. | 10.7 | 12.6 |
| | (ZrO$_2$ − 7.3 mole % YO$_{3/2}$ − 5.2 mole % YTaO$_4$) | 1500° C. | Microcracked | |
| 48 | 96% (ZrO$_2$ − 2 mole % Y$_2$O$_3$) + 4% YTaO$_4$) | 1300° C. | 11.3 | 13.4 |
| | | 1400° C. | 10.7 | 15.5 |
| | (ZrO$_2$ − 3.8 mole % YO$_{3/2}$ − 2 mole % YTaO$_4$) | 1500° C. | 9.5 | 7.1 |
| 49 | 90% (ZrO$_2$ − 2 mole % Y$_2$O$_3$) + 10% YTaO$_4$) | 1300° C. | 10.1 | 6.4 |
| | | 1400° C. | 9.8 | 13.8 |
| | (ZrO$_2$ − 3.7 mole % YO$_{3/2}$ − 5.3 mole % YTaO$_4$)) | 1500° C. | Microcracked | |
| 50 | 90% (ZrO$_2$ − 3 mole % Y$_2$O$_3$) + 10% Y(Nb$_{0.5}$Ta$_{0.5}$)O$_4$ | 1300° C. | 10.4 | 4.9 |
| | | 1400° C. | 10.9 | 5.4 |
| | [ZrO$_2$ − 7.3 mole % YO$_{3/2}$ − 5.2 mole % Y(Ta$_{0.5}$Nb$_{0.5}$)O$_4$] | 1500° C. | 9.8 | 12.7 |
| | | 1600° C. | Microcracked | |
| 51 | 95% (ZrO$_2$ − 3 mole % Y$_2$O$_3$) + 5% LaNbO$_4$ | 1300° C. | 9.8 | 5.2 |
| | | 1400° C. | 10.4 | 12.1 |
| | (ZrO$_2$ − 5.7 mole % YO$_{3/2}$ − 2.6 mole % LaNbO$_4$) | 1500° C. | Microcracked | |
| | | 1600° C. | Microcracked | |
| 52 | 95% (ZrO$_2$ − 3 mole % Y$_2$O$_3$) + 5% NdNbO$_4$ | 1300° C. | 10.9 | 4.5 |
| | | 1400° C. | 10.9 | 12.0 |
| | (ZrO$_2$ − 5.7 mole % YO$_{3/2}$ − 2.6 mole % NdNbO$_4$) | 1500° C. | Microcracked | |
| | | 1600° C. | Microcracked | |
| 53 | 95% (ZrO$_2$ − 3 mole % Y$_2$O$_3$) + 5% (Yb$_{0.5}$Gd$_{0.5}$)NbO$_4$ | 1300° C. | 11.6 | 4.3 |
| | | 1400° C. | 11.6 | 4.8 |
| | [ZrO$_2$ − 5.7 mole % YO$_{3/2}$ − 2.6 mole % (Yb$_{0.5}$Gd$_{0.5}$)NbO$_4$] | 1500° C. | 10.9 | 11.5 |
| | | 1600° C. | Microcracked | |
| 54 | 94% (ZrO$_2$ − 3 mole % | | | |

TABLE VIII-continued

| Example | Composition | Sintering Temperature | GPa | $K_{IC}$ |
|---|---|---|---|---|
| | [YbGd]$_2$O$_3$) | 1300° C. | 9.1 | 6.1 |
| | + 6% (Yb$_{0.5}$Gd$_{0.5}$)NbO$_4$ | 1400° C. | 10.7 | 9.8 |
| | [ZrO$_2$ – 5.6 mole % (Yb$_{0.5}$Gd$_{0.5}$)O$_{3/2}$ | 1500° C. | Microcracked | |
| | – 3.1 mole % (Yb$_{0.5}$Gd$_{0.5}$)NbO$_4$] | 1600° C. | Microcracked | |

As is evident from a study of Table VIII, various rare earth elements can be substituted for yttrium, and tantalum can replace niobium with no deleterious effect upon the capability of improving the toughness of yttrium-doped zirconia-containing bodies. Accordingly, whereas YNbO$_4$ constitutes the most preferred toughening agent, YTaO$_4$ and mixtures of YNbO$_4$ and YTaO$_4$ are operable, as are rare earth niobates MNbO$_4$), rare earth tantalates (MTaO$_4$), and mixtures of YNbO$_4$ and/or YTaO$_4$ with MNbO$_4$ and/or MTaO$_4$.

Additionally, Example 54 illustrates that rare earth oxides can fully replace yttria in both the YNbO$_4$ and as the "partial stabilization" dopant in the zirconia. As the exact distribution of cations between the possible phases in these alloys is not known, the Examples 51, 52, and 53 prove that over one third of the total amount of yttria can be replaced by La$_2$O$_3$, Nd$_2$O$_3$ or YbGdO$_3$. It is reasonable to assume that various rare earth oxides including CeO$_2$, Pr$_2$O$_3$, La$_2$O$_3$ and Nd$_2$O$_3$ as well as mixtures of rare earth oxides can fully replace yttria in these compositions.

Because of the inherent high toughness values exhibited by the above ZrO$_2$-Y$_2$O$_3$-YNbO$_4$ ceramic alloys, their utility as toughening agents in various highly refractory ceramic matrices was investigated. A rapid, cursory survey of a wide variety of ceramic matrices was undertaken to determine their general efficacy.

In preparation for the study, powders of the following three compositions of ZrO$_2$-Y$_2$O$_3$-YNbO$_4$ were made utilizing the variation of the coprecipitation procedure outlined above involving precipitation with NH$_4$OH; viz., ZrO$_2$-2 mole % Y$_2$O$_3$+8 weight % YNbO$_4$, ZrO$_2$- 2 mole % Y$_2$O$_3$+10 weight % YNbO$_4$, and ZrO$_2$- 1 mole % Y$_2$O$_3$+12 weight % YNbO$_4$. Another powder sample of a ZrO$_2$-Y$_2$O$_3$-YNbO$_4$ composition, viz., ZrO$_2$- 2 mole % Y$_2$O$_3$+4 weight % YNbO$_4$, was prepared utilizing the oxide addition method described above.

As will be explained in detail below, those powders were combined with an alumina powder, a magnesium-rich spinel powder, an aluminum-rich spinel powder, a zircon powder, a titanium diboride powder, a zirconium carbide powder, mullite powder, silicon carbide powder, and silicon carbide whiskers. The resulting powder mixtures, as well as samples of the matrix materials only, were vibramilled for 24 hours in isopropyl alcohol using relatively large ZrO$_2$ milling media.

Pills having a diameter of about 0.5" were uniaxially pressed at about 1000-5000 psi from the oxide powders and the pills isostatically cold pressed at 45,000 psi. Thereafter, the pills were pre-fired in air to 1000° C. for two hours and then sintered for two hours at selected temperatures between 1450°-1650° C. in a vacuum furnace. Both the heating rate and the cooling rate for the sintering studies were 800° C./hour.

Powders of the carbide, boride, and oxides were hot pressed for two hours at 1450° C. or 1650° C. at a pressure of 4000 psi in an induction-heated hot press using graphite molds under vacuum to produce discs having a diameter of about 1.5" and a cross section of about 5/16". The sintered and hot pressed samples were ground and polished to a one micron diamond finish, and those samples examined by optical microscopy.

Microhardness testing was performed on the polished discs utilizing a 10 kg load. The elastic modulus of zirconia yttrium niobate was assumed to be 200 GPa; the elastic modulus of alumina was assumed to be 380 GPa; the elastic modulus of spinel was assumed to be 260 GPa; the elastic modulus of zircon was assumed to be 200 GPa; the elastic modulus of titanium diboride was assumed to be 515 GPa; the elastic modulus of zirconium carbide was assumed to be 410 GPa; the elastic modulus of mullite was assumed to be 200 GPa; and the modulus of silicon carbide powder and silicon carbide whiskers was assumed to be 450 GPa. For compositions involving combinations of the various oxides and non-oxides, the elastic modulus of the alloy was assumed to be a simple linear combination (by volume) of the elastic moduli of the components. Fracture toughness was calculated from the equation recited above.

Several samples of the sintered alumina zirconia yttrium niobate compositions were examined by x-ray diffraction. The x-ray diffraction scans were limited to the region of 2θ ranging from 26°-36° using Cu radiation. The amount of tetragonal zirconia yttrium niobate phase(s) and the amount of monoclinic zirconia yttrium niobate phase(s) were assessed qualitatively from the relative peak heights of the phases in that region of 2θ.

In the case of the zirconia yttrium niobate-silicon carbide whisker composite, the whiskers and the zirconia yttrium niobate powder were first vibramilled for 24 hours in distilled water. In preparing the two ZrO$_2$-YNbO$_4$/glass/SiC whisker composites, a glass powder consisting, in weight percent, of about 33.3% Al$_2$O$_3$, 33.3% SiO$_2$, and 33.3% Y$_2$O$_3$ was produced by: milling Al$_2$O$_3$ and SiO$_2$ together; preparing a slurry in distilled water of that glass powder plus Y(NO$_3$)$_3$.6H$_2$O; drying the water; and calcining the material remaining at 500° C. Thereafter, the glass powder, the silicon carbide whiskers, and zirconia yttrium niobate powder were vibramilled for 48 hours in distilled water utilizing zirconia milling media. The resultant powders for all three composites were dried, granulated, and vacuum hot pressed for two hours at 1450° C. at 4000 psi in graphite molds. The elastic modulus of the added glass was assumed to be 69 GPa.

Alumina-Zirconia Yttrium Niobate

In addition to the powder combinations of alumina and zirconia yttrium niobate referred to above, two Al$_2$O$_3$-ZrO$_2$-Y$_2$O$_3$-YNbO$_4$ compositions were coprecipitated and sintered in the manner described above with respect to other coprecipitated specimens. Two compositions are reported below as Examples A and B. Portions of the powders of those two compositions were modified by adding Nb$_2$O$_5$ and Y$_2$O$_3$ utilizing a variation of the coprecipitation technique involving precipitation with NH$_4$OH. Those two compositions are recorded below as Examples C and D.

Three powder combinations of alumina and zirconia yttrium niobate are tabulated below as Examples E, F, and G, as is a specimen of alumina alone, Example H.

Table IX recites the composition of each sample (in volume percent) and the temperatures at which the samples were sintered, along with Vickers hardness measurements (GPa) and fracture toughness values ($K_{IC}$) calculated from the equation discussed above and expressed in terms of $MPa\sqrt{m}$. As has been noted previously, all of the sintered specimens were ground and polished before microhardness measurements were undertaken employing a 10 kg load.

TABLE IX

| Example | Composition | Sintering Temperature | GPa | $K_{IC}$ |
|---|---|---|---|---|
| A | 20%($ZrO_2$ − 3 mole % $Y_2O_3$) + 1.25% $YNbO_4$ + 78.75% $Al_2O_3$ | 1450° | 15.2 | 4.3 |
|   |   | 1600° | 12.2 | 4.7 |
|   |   | 1650° | 12.6 | 4.2 |
| B | 43%($ZrO_2$ − 3 mole % $Y_2O_3$) + 3% $YNbO_4$ + 54% $Al_2O_3$ | 1450° | 14.8 | 5.1 |
|   |   | 1500° | 13.5 | 4.8 |
|   |   | 1550° | 13.1 | 6.6 |
|   |   | 1600° | 12.4 | 6.5 |
|   |   | 1650° | 12.7 | 5.7 |
| C | 18%($ZrO_2$ − 0 mole % $Y_2O_3$) + 6% $YNbO_4$ + 76% $Al_2O_3$ | 1450° | 12.4 | 6.9 |
|   |   | 1550° | Microcracked |  |
|   |   | 1650° | " |  |
| D | 40%($ZrO_2$ − 2 mole % + 8% $YNbO_4$ + 52% $Al_2O_3$ | 1450° | 13.5 | 4.7 |
|   |   | 1550° | 13.5 | 6.7 |
|   |   | 1650° | 12.0 | 6.4 |
| E | 21%($ZrO_2$ − 1 mole % $Y_2O_3$) + 4% $YNbO_4$ + 75% $Al_2O_3$ | 1450° | 11.6 | 5.6 |
|   |   | 1550° | 14.5 | 5.4 |
|   |   | 1650° | 12.4 | 6.7 |
| F | 45%($ZrO_2$ − 2 mole % $Y_2O_3$) + 5% $YNbO_4$ + 50% $Al_2O_3$ | 1450° | 12.7 | 6.2 |
|   |   | 1550° | 12.2 | 7.8 |
|   |   | 1650° | 11.5 | 8.7 |
| G | 72%($ZrO_2$ − 2 mole % $Y_2O_3$) + 3% $YNbO_4$ + 25% $Al_2O_3$ | 1450° | 12.0 | 11.5 |
|   |   | 1500° | 12.4 | 12.5 |
|   |   | 1550° | 12.2 | 12.2 |
|   |   | 1600° | 9.8 | 3.6 |
|   |   | 1650° | 9.8 | 4.4 |
| H | 100% $Al_2O_3$ | 1450° | Porous |  |
|   |   | 1500° | 15.4 | 4.5 |
|   |   | 1550° | 15.0 | 4.3 |
|   |   | 1600° | 14.5 | 5.0 |
|   |   | 1650° | 15.0 | 5.4 |

The $Al_2O_3$ specimen sintered at 1450° C. was highly porous and that sintered at 1500° C. exhibited considerable porosity. However, the addition of as little as 25% by volume zirconia=yttrium niobate allowed the ceramic alloys to achieve full density when fired at 1450° C. Moreover, the grain size of the alloy was considerably smaller than that observed in the $Al_2O_3$ sample. Hence, the inclusion of $ZrO_2$-$YNbO_4$ assists sintering, and grain growth is impeded through the addition of the second phase.

As is evident from Table IX, the toughness of all the samples containing zirconia yttrium niobate was greater than that of the $Al_2O_3$ specimen, whereas the reverse was true with respect to hardness. The toughness of the samples containing 75% by volume zirconia yttrium niobate fell dramatically when the composition was sintered at 1600° and 1650° C. The hardness value also fell substantially at those two sintering temperatures.

Scanning electron micrographs have indicated that the coprecipitated compositions have a somewhat more uniform spatial distribution of the alumina and zirconia yttrium niobate phases than the mixed materials. The grain sizes of the coprecipitated materials also appeared to be slightly smaller for a given sintering temperature. Finally, it appeared that there may be more intragranular grains of zirconia yttrium niobate trapped within the $Al_2O_3$ grains in the coprecipitated samples.

Wet chemical analyses were conducted on the two coprecipitated specimens and those results, in weight percent, are listed in Table X. The $HfO_2$ is an impurity in the $ZrO_2$ material.

TABLE X

| Example | $Al_2O_3$ | $ZrO_2$ | $Nb_2O_5$ | $Y_2O_3$ | $HfO_2$ |
|---|---|---|---|---|---|
| A | 71.4 | 25.1 | 0.92 | 2.18 | 0.43 |
| B | 44.1 | 44.8 | 1.97 | 4.32 | 0.84 |

The specimens of Example C that were sintered at temperatures higher than 1450° C. were subject to indentation impressions from the hardness testing and were heavily microcracked, such that no reliable hardness or toughness values could be obtained.

X-ray diffraction analyses of the several samples indicated the presence of two basic regimes of microstructures of high toughness with regard to the content of tetragonal and monoclinic $ZrO_2$ with $YNbO_4$; viz., bodies containing greater than 50% by volume $Al_2O_3$ and those containing less than 50% by volume $Al_2O_3$. To illustrate, Example G (75% by volume zirconia yttrium niobate) displayed a diffraction pattern quite similar to that of zirconia yttrium niobate alone (with, of course, the inclusion of $Al_2O_3$ peaks). Samples that manifested high toughness evidenced very little or no monoclinic phase. Samples of lower toughness still contained the tetragonal phase as the predominant portion, but a substantial amount of the monoclinic phase was present. In contrast, samples containing about 50% by volume or less of zirconia yttrium niobate did not display the highest toughness when the diffraction pattern indicated the presence of the tetragonal phase only. The toughest samples contained about 20–50% by volume of the total amount of the zirconia yttrium niobate in the sample in the monoclinic state. When the majority of the zirconia yttrium was in the monoclinic phase, the specimens exhibited microcracking and low toughness.

Table XI reports compositions of further powder combinations involving alumina illustrating effects upon hardness and toughness. The compositions are tabulated in terms of volume % along with the temperature at which each specimen was sintered,. Vickers hardness measurements (GPa), and fracture toughness values ($K_{IC}$) calculated in terms of MPa$\sqrt{m}$. Again, each sintered pill was ground and polished prior to being subjected to microhardness measurements employing a 10 kg load.

TABLE XI

| Example | Composition | Sintering Temperature | H GPa | $K_{IC}$ MPa$\sqrt{m}$ |
|---|---|---|---|---|
| I | 15% ZrO$_2$ + 85% Al$_2$O$_3$ | 1550° C. | 11.6 | 7.1 |
|   |   | 1650° C. | 11.3 | 7.4 |
| J | 25% ZrO$_2$ + 75% Al$_2$O$_3$ | 1550° C. | 12.0 | 7.7 |
|   |   | 1650° C. | 11.6 | <8.6 |
| K | 25% (ZrO$_2$-1 mole % Y$_2$O$_3$) + 75% Al$_2$O$_3$ | 1550° C. | 13.5 | 5.9 |
|   |   | 1650° C. | 10.9 | 5.4 |
| L | 50% ZrO$_2$ + 50% Al$_2$O$_3$ | 1450° C. | Microcracked | |
|   |   | 1550° C. | Microcracked | |
|   |   | 1650° C. | Microcracked | |
| M | 50% (ZrO$_2$-2 mole % Y$_2$O$_3$) + 50% Al$_2$O$_3$ | 1450° C. | 12.9 | 6.8 |
|   |   | 1550° C. | 13.0 | 10.2 |
|   |   | 1650° C. | 12.7 | 6.9 |
| N | 75% ZrO$_2$ + 25% Al$_2$O$_3$ | 1450° C. | Microcracked | |
|   |   | 1550° C. | Microcracked | |
|   |   | 1650° C. | Microcracked | |
| O | 75% (ZrO$_2$-2 mole % Y$_2$O$_3$) + 25% Al$_2$O$_3$ | 1450° C. | 12.4 | 7.5 |
|   |   | 1550° C. | 12.2 | 8.9 |
|   |   | 1650° C. | 12.0 | 11.2 |
| P | 24% (ZrO$_2$-2.3 mole %) NbO$_{5/2}$) + 76% Al$_2$O$_3$ | 1450° C. | Microcracked | |
|   |   | 1550° C. | Microcracked | |
|   |   | 1650° C. | Microcracked | |
| Q | 24% (ZrO$_2$-11 mole % NbO$_{5/2}$) + 76% Al$_2$O$_3$ | 1450° C. | Microcracked | |
|   |   | 1550° C. | Microcracked | |
|   |   | 1650° C. | Microcracked | |
| R | 14.5% ZrO$_2$ + 0.5% NbO$_4$ + 85% Al$_2$O$_3$ | 1550° C. | 14.0 | 7.8 |
|   |   | 1650° C. | measurement difficult due to chipping | |
| S | 14% ZrO$_2$ + 1% YNbO$_4$ + 85% Al$_2$O$_3$ | 1550° C. | 14.0 | 5.7 |
|   |   | 1650° C. | measurement difficult due to chipping | |
| T | 12% ZrO$_2$ + 3% YNbO$_4$ + 85% Al$_2$O$_3$ | 1550° C. | 17.1 | 4.3 |
|   |   | 1650° C. | 15.4 | 5.9 |
| U | 24% ZrO$_2$ + 1% YNbo$_4$ + 75% Al$_2$O$_3$ | 1550° C. | 10.9 | 6.7 |
|   |   | 1650° C. | 10.9 | 10.0 |
| V | 22% ZrO$_2$ + 3% YNbO$_4$ + 75% Al$_2$O$_3$ | 1550° C. | 12.2 | <5.7 |
|   |   | 1650° C. | 9.3 | 9.1 |
| W | 19% ZrO$_2$ + 6% YNbo$_4$ + 75% Al$_2$O$_3$ | 1550° C. | 14.0 | 4.4 |
|   |   | 1650° C. | 12.0 | 6.0 |
| X | 24% (ZrO$_2$-1 mole % Y$_2$O$_3$) + 1% YNbo$_4$ + 75% Al$_2$O$_3$ | 1550° C. | 14.2 | 5.0 |
|   |   | 1650° C. | 12.4 | 6.1 |
| Y | 22% (ZrO$_2$-1 mole % Y$_2$O$_3$) + 3% YNbo$_4$ + 75% Al$_2$O$_3$ | 1550° C. | 14.0 | 5.7 |
|   |   | 1650° C. | 14.0 | 4.6 |
| Z | 19% (ZrO$_2$-1 mole % Y$_2$O$_3$) + 6% YNbo$_4$ + 75% Al$_2$O$_3$ | 1550° C. | 14.5 | 4.0 |
|   |   | 1650° C. | 13.7 | 4.1 |

Examination of Tables IX and XI permits a number of conclusions:

First, the additions of yttrium niobate can improve the toughness of 50 to 75 volume percent zirconia partially stabilized with 2 mole percent yttria with 50 to 25 volume percent alumina at some sintering temperatures. Compare the pairs of samples G–O and F–M.

Second, some addition of yttrium niobate increased the toughness of compositions with 15 or 25 volume percent of zirconia or zirconia yttria phases. At the 15 and 25 volume percent level for zirconia-yttria-yttrium niobate phase or phases, additions of small amounts of yttrium niobate increase toughness but larger amounts decrease toughness; Example I vs. Examples R, S and T; Example J vs. U, V and W; and Example K vs. Examples X, Y and Z.

Third, Examples P and Q prove that additions of niobia alone to alumina zirconia ceramic alloys do not result in whole unmicrocracked bodies.

Fourth, additions of zirconia without yttria or yttrium niobate to alumina at the 15 and 25 volume percent levels toughen alumina, Examples I and J, while at the 50 and 75 volume percent levels the materials microcrack heavily, Examples L and N. When zirconia with two mole percent yttria is added to alumina at the 50 to 75 volume percent levels the materials are not microcracked and are toughened, Examples M and O. These data illustrate that for the zirconia yttria alumina system, adjustments of the minor component, yttria, exert a decisive effect on the mechanical integrity and toughness of the body.

The data in Table IX and XI prove that, in a manner similar to the case of the zirconia yttria alumina system described above, adjustments of the compositions with yttrium niobate also have a decisive effect upon toughness; in particular, small amounts of yttrium niobate increase the toughness while larger amounts of YNbO$_4$ appear to help "stabilize" the tetragonal phase to prevent transformation to the monoclinic phase and thus lower toughness. This effect is not obvious and would be unexpected even to the worker of more than ordinary skill in the art.

Spinel-Zirconia Yttrium Niobate

The magnesia-rich spinel consisted essentially, in weight percent, of 28.9% MgO, 71.1% Al$_2$O$_3$, and the alumina-rich spinel consisted essentially, in weight percent, of 26.65% MgO, 73.35% Al$_2$O$_3$. Toughness ($K_{IC}$ in terms of MPa$\sqrt{m}$) and Vickers hardness (GPa) data as a function of sintering temperature and composition, in volume percent, of the ceramic alloy samples are reported below in Table XII for the magnesia-rich spinel specimens and in Table XIII for the alumina-rich spinel samples. Values for sintered specimens of each spinel alone are also provided for comparison.

TABLE XII

| Example | Composition | Sintering Temperature | GPa | $K_{IC}$ |
|---|---|---|---|---|
| AA | 21%(ZrO$_2$ − 1 mole % Y$_2$O$_3$) + 4% YNbO$_4$ + 75% Spinel | 1450° | 11.8 | 3.7 |
|   |   | 1550° | 11.6 | 2.4 |
|   |   | 1650° | Microcracked | |
| BB | 45%(ZrO$_2$ − 2 mole % Y$_2$O$_3$) + 5% YNbO$_4$ + 50% Spinel | 1450° | 12.0 | 5.1 |
|   |   | 1550° | 10.4 | 6.1 |
|   |   | 1650° | Microcracked | |
| CC | 72%(ZrO$_2$ − 2 mole % Y$_2$O$_3$) + 3% YNbO$_4$ + 25% Spinel | 1450° | 10.6 | 9.9 |
|   |   | 1500° | 10.8 | 14.0 |
|   |   | 1550° | 10.4 | 1.2 |
|   |   | 1600° | Microcracked | |

TABLE XII-continued

| Example | Composition | Sintering Temperature | GPa | $K_{IC}$ |
|---|---|---|---|---|
| DD | 100% Spinel | 1550° | 10.3 | 2.7 |
| | | 1600° | 8.0 | 2.5 |
| | | 1650° | 10.4 | 2.3 |

The spinel alone did not sinter to a high density at temperatures of 1450° and 1500° C., whereas the alloy specimens were highly dense after firing at those temperatures. All of the samples containing zirconia yttrium niobate were heavily microcracked after sintering at 1650° C. The hardness of the alloy samples was somewhat greater than that of the spinel alone, and the toughness of the alloy samples was about twice that of the spinel at 50% and higher volume fractions of zirconia yttrium niobate.

TABLE XIII

| Example | Composition | Sintering Temperature | GPa | $K_{IC}$ |
|---|---|---|---|---|
| EE | 21%(ZrO$_2$ − 1 mole % Y$_2$O$_3$) + 4% YNbO$_4$ + 75% Spinel | 1450° | 10.9 | 3.9 |
| | | 1550° | 8.8 | 2.9 |
| | | 1650° | Microcracked | |
| FF | 45%(ZrO$_2$ − 2 mole % Y$_2$O$_3$) + 5% YNbO$_4$ + 50% Spinel | 1450° | 10.9 | 4.8 |
| | | 1550° | 6.9 | 2.5 |
| | | 1650° | Microcracked | |
| GG | 72%(ZrO$_2$ − 2 mole % Y$_2$O$_3$) + 3% YNbO$_4$ + 25% Spinel | 1450° | 10.4 | 8.2 |
| | | 1500° | 11.1 | 12.7 |
| | | 1550° | 10.0 | 13.0 |
| | | 1600° | Microcracked | |
| HH | 100% Spinel | 1500° | 9.8 | 2.3 |
| | | 1550° | 8.1 | 3.4 |
| | | 1600° | 6.7 | — |
| | | 1650° | 8.4 | 3.3 |

The spinel alone could not be sintered to high density at 1450° C., whereas the ceramic alloys evidenced good density when fired at that temperature. The hardness of the alloy samples was, perhaps, slightly higher than that of the spinel alone and exhibited the same trend of decreasing with higher firing temperatures. The toughness of the alloy samples was marginally higher than that of the spinel alone at low levels of zirconia yttrium niobate additions, but rose sharply with additions greater than 50 percent by volume. Optical microscopy indicated that the grain size of the sintered spinel-zirconia yttrium niobate alloy is substantially smaller than that present in the sintered spinel specimens. The same observation was made with respect to the alumina zirconia yttrium niobate alloys.

Zircon-Zirconia Yttrium Niobate

Samples of powdered zircon alone did not sinter to high density at 1450° and 1500° C. Because the zircon powder employed in this study was coarser than the alumina and spinel powders used above, the particles thereof agglomerated sufficiently to prevent specimens containing 25 volume percent of zirconia yttrium niobate from reaching full density when sintered at 1450° C. At higher temperatures the samples of zircon alone began to dissociate in the reduced pressure of the vacuum furnace. Hence, the zircon specimens fired at 1600° and 1650° C. evidenced areas, especially near the surface of the samples, that were more porous than the zircon body sintered at 1550° C. Those porous regions contained large amounts of second phases, e.g., ZrO$_2$ and a grain boundary silicate phase. Other areas in the interior of the samples were not as porous and appeared to contain less ZrO$_2$ and silicate phases. The alloy specimens were not as porous when sintered at higher temperatures. It is believed that the presence of the zirconia yttrium niobate suppressed dissociation of the zircon.

Toughness ($K_{IC}$ in terms of MPa$\sqrt{m}$) and Vickers hardness (GPa) data as a function of sintering temperature and composition, in volume percent, of the ceramic alloy samples are recorded below in Table XIV. Values for sintered specimens of zircon alone are also listed for comparison purposes.

TABLE XIV

| Example | Composition | Sintering Temperature | GPa | $K_{IC}$ |
|---|---|---|---|---|
| II | 21%(ZrO$_2$ − 1 mole % Y$_2$O$_3$) + 4% YNbO$_4$ + 75% Zircon | 1450° | 5.9 | 5.5 |
| | | 1550° | 8.4 | 5.1 |
| | | 1650° | Microcracked | |
| JJ | 45% (ZrO$_2$ − 2 mole % Y$_2$O$_3$) + 5% YNbO$_4$ + 50% Zircon | 1450° | 10.4 | 4.9 |
| | | 1550° | 10.1 | 5.5 |
| | | 1650° | Microcracked | |
| KK | 72% (ZrO$_2$ − 2 mole % Y$_2$O$_3$) + 3% YNbO$_4$ + 25% Zircon | 1450° | 10.9 | 9.0 |
| | | 1500° | 9.3 | 4.8 |
| | | 1550° | 8.9 | 5.1 |
| | | 1600° | 9.0 | 5.4 |
| | | 1650° | Microcracked | |
| LL | 100% Zircon | 1500° | 6.9 | 2.8 |
| | | 1550° | 8.4 | 3.1 |
| | | 1600° | 8.0 | 2.7 |

TABLE XIV-continued

| Example | Composition | Sintering Temperature | GPa | $K_{IC}$ |
|---------|-------------|----------------------|-----|----------|
|         |             | 1650°                | 8.0 | 2.9      |

The alloy specimens were, perhaps, slightly harder than zircon alone and were unquestionably considerably tougher.

Zirconium Carbide-Zirconia Yttrium Niobate

A sample of zirconium carbide alone and three samples of differing levels of zirconium carbide-zirconia yttrium niobate ceramic alloy were hot pressed to high density at 1450° C. Toughness ($K_{IC}$ in terms of MPa$\sqrt{m}$) and Vickers hardness (GPa) data as a function of composition in volume percent are recited below in Table XV.

TABLE XV

| Example | Composition | GPa | $K_{IC}$ |
|---------|-------------|-----|----------|
| MM | 21% ($ZrO_2$ − 1 mole % $Y_2O_3$) + 4% $YNbO_4$ + 75% $ZrC_{0.88}$ | — | 5.2 |
| NN | 45% ($ZrO_2$ − 2 mole % $Y_2O_3$) + 5% $YNbO_4$ + 50% $ZrC_{0.88}$ | 12.7 | 8.1 |
| OO | 69% ($ZrO_2$ − 2 mole % $Y_2O_3$) + 6% $YNbO_4$ + 25% $ZrC_{0.88}$ | 11.3 | 6.7 |
| PP | 100% $ZrC_{0.88}$ | 10.4 | 4.9 |

It is apparent from Table XV that the ceramic alloys are somewhat harder and stronger than the zirconium carbide alone.

Mullite-Zirconia Yttrium Niobate

Table XVI records the composition of each sample (in volume %) and the temperatures at which the specimens were sintered, along with Vickers hardness measurements (GPa) and fracture toughness values ($K_{IC}$) calculated in terms of MPa$\sqrt{m}$. In like manner to the above samples, each sintered sample was ground and polished before microhardness measurements were conducted utilizing a 10 kg load.

TABLE XVI

| Example | Composition | Sintering Temperature | GPa | $K_{IC}$ |
|---------|-------------|----------------------|-----|----------|
| QQ | 24% $ZrO_2$ + 1% $YNbO_4$ + 75% Mullite | 1450° C. | Porous | |
|   |   | 1550° C. | 8.4 | 4.5 |
|   |   | 1650° C. | 8.9 | 5.1 |
| RR | 24% ($ZrO_2$ − 2 mole % $Y_2O_3$) + 1% $YNbO_4$ + 75% Mullite | 1450° C. | Porous | |
|   |   | 1550° C. | 11.3 | 3.7 |
| SS | 48% ($ZrO_2$ − 2 mole % $Y_2O_3$) + 2% $YNbO_4$ + 50% Mullite | 1450° C. | 9.5 | 5.2 |
|   |   | 1550° C. | 9.8 | 4.9 |
|   |   | 1650° C. | Microcracked | |
| TT | 72% ($ZrO_2$ − 2 mole % $Y_2O_3$) + 3% $YNbO_4$ + 25% Mullite | 1450° C. | 10.7 | 7.0 |
|   |   | 1550° C. | 8.9 | 4.3 |
|   |   | 1650° C. | Microcracked | |
| UU | 100% Mullite | 1450° C. | Porous | |
|   |   | 1550° C. | Porous | |
|   |   | 1650° C. | 10.7 | 2.1 |

The above data illustrate that the toughness of mullite bodies can be improved significantly through additions of zirconia yttrium niobate, and that zirconia yttrium niobate can assist the sintering of mullite bodies.

SiC Powder-Zirconia Yttrium Niobate

Table XVII presents the composition of each sample (in volume %) and the temperature at which the samples were hot pressed, along with Vickers hardness measurements (GPa) and fracture toughness values ($K_{IC}$) calculated in terms of MPa$\sqrt{m}$. Each hot pressed body was ground and polished prior to microhardness measurements being undertaken employing a 10 kg load.

TABLE XVII

| Example | Composition | Hot Pressing Temperature | GPa | $K_{IC}$ |
|---------|-------------|-------------------------|-----|----------|
| VV | 100% SiC | 1650° C. | Porous | |
| WW | 24% ($ZrO_2$ − 2 mole % $Y_2O_3$) + 1% $YNbO_4$ + 75% SiC | 1650° C. | 12.4 | 5.4 |
| XX | 48% ($ZrO_2$ − 2 mole % $Y_2O_3$) + 2% $YNbO_4$ + 50% SiC | 1450° C. | 9.8 | 7.3 |
| YY | 73% ($ZrO_2$ − 2 mole % $Y_2O_3$) + 3% $YNbO_4$ + 24% SiC | 1450° C. | 12.4 | 5.6 |

SiC cannot be hot pressed to bodies of full density at the temperatures and pressures that yielded dense composites of SiC-zirconia yttrium niobate. The technical literature has reported toughness values for commercial SiC ranging between about 2-4 MPa m. The data of Table XVII clearly indicate that additions of zirconia yttrium niobate can enhance the toughness of SiC bodies.

SiC Whiskers-Zirconia Yttrium Niobate

One sample consisting solely of SiC whiskers and zirconia yttrium niobate and two samples comprising SiC whiskers, zirconia yttrium niobate, and 15% by volume of the glass described above were hot pressed at 1450° C. The glass was incorporated to ease fabrication of a dense body. Vickers hardness (GPa) and toughness ($K_{IC}$ in terms of MPa$\sqrt{m}$) values as a function of composition, in volume percent, are listed below in Table XVIII.

TABLE XVIII

| Example | Composition | GPa | $K_{IC}$ |
|---|---|---|---|
| ZZ | 72% ($ZrO_2$ − 2 mole % $Y_2O_3$) + 3% $YNbO_4$ + 25% whiskers | 12.6 | 8.5 |
| AAA | 34% ($ZrO_2$ − 2 mole % $Y_2O_3$) + 1% $YNbO_4$ + 15% glass + 50% whiskers | 13.0 | 6.4 |
| BBB | 57% ($ZrO_2$ − 2 mole % $Y_2O_3$) + 3% $YNbO_4$ + 15% glass + 25% whiskers | 11.7 | 5.2 |

Titanium Diboride-Zirconia Yttrium Niobate

Table XIX reports Vickers hardness (GPa) and ($K_{IC}$ in terms of MPa$\sqrt{m}$) toughness data as a function of composition, in volume percent, of several titanium diboride-zirconia yttrium niobate alloys which were hot pressed at 1450° C. Titanium diboride has a toughness of less than 4 MPa$\sqrt{m}$. When pure titanium diboride was subjected to the same hot pressing procedure, the material did not densify.

TABLE XIX

| Example | Composition | GPa | $K_{IC}$ |
|---|---|---|---|
| CCC | 21% ($ZrO_2$ − 1 mole % $Y_2O_3$) + 4% $YNbO_4$ + 75% $TiB_2$ | 13.1 | 8.4 |
| DDD | 45% ($ZrO_2$ − 2 mole % $Y_2O_3$) + 5% $YNbO_4$ + 50% $TiB_2$ | 11.0 | — |
| EEE | 69% ($ZrO_2$ − 2 mole % $Y_2O_3$) + 6% $YNbO_4$ + 25% $TiB_2$ | 10.4 | 7.7 |

Whereas the above description has been drawn to shaped bodies produced through such means as hot pressing and sintering, it will be recognized that the term bodies includes such variants as beads, coatings, fibers, honeycombs, and sheets fabricated utilizing the wide variety of methods known to the art, including, but not limited to, arc melting, chemical vapor depositions, extrusion, plasma spraying, skull melting, and zone melting. For example, the hardness and toughness exhibited by the inventive materials strongly recommend their utility as abrasion resistant and thermal barrier coatings.

Figure 2:
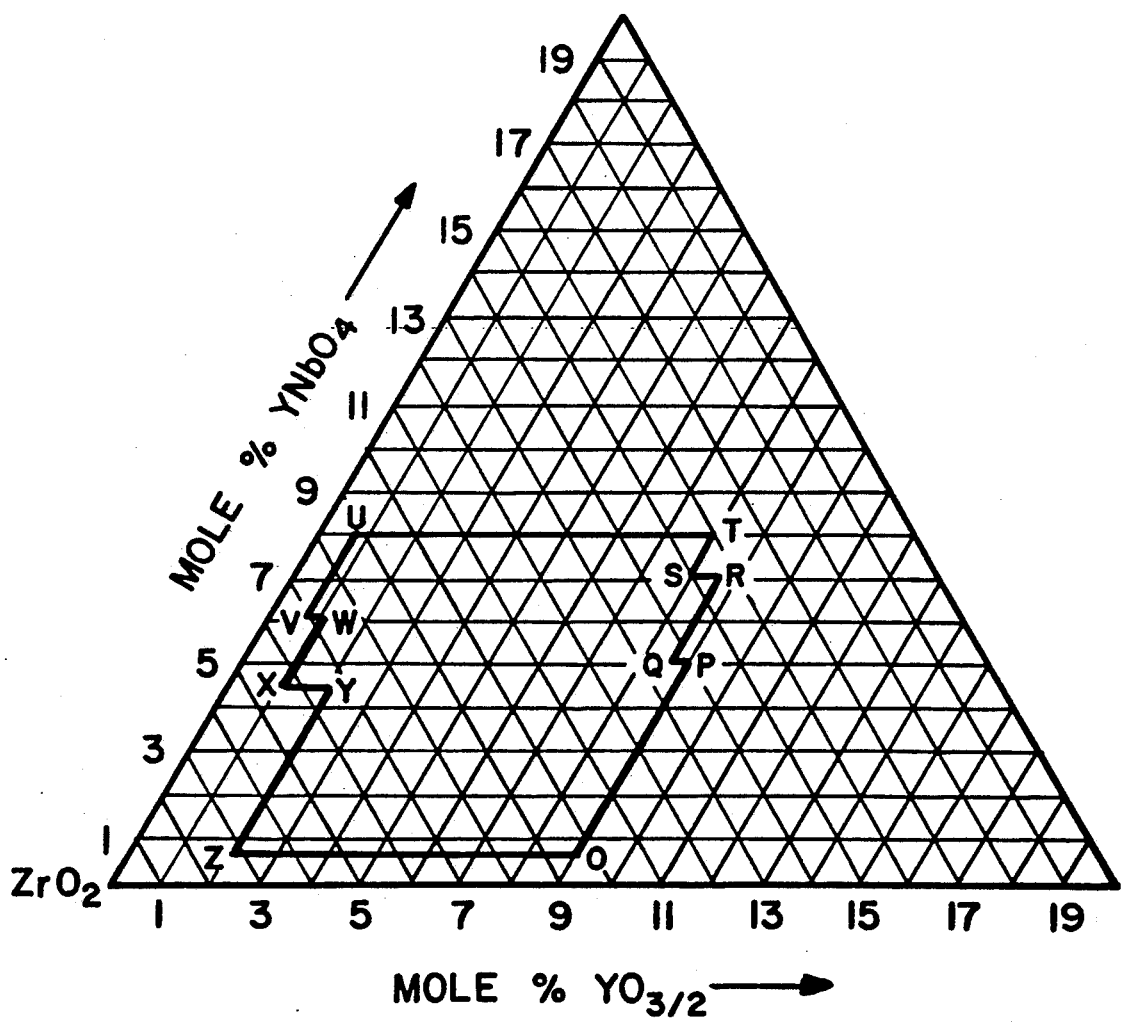
FIG. 2 depicts a polygon O-P-Q-R-S-T-U-V-W-X-Y-Z-O enclosing the inventive composition region operable in obtaining intact sintered bodies of high toughness.

Based upon the above exemplary embodiments, the polygon O-P-Q-R-S-T-U-V-W-X-Y-Z-O presented in FIG. 2 was devised which encompasses compositions operable in the instant invention. That polygon was drawn founded in the following parameters where $YO_{3/2}$ is the additive producing the partial stabilization:

(a) $YO_{3/2}$ is in the range of about 2.2–9% on a molar basis when the amount of $YNbO_4$ and/or $YTaO_4$ and/or $MNbO_4$ and/or $MTaO_4$ is between about 0.5–4.4% on a molar basis;

(b) $YO_{3/2}$ is in the range of about 1.2–9% on a molar basis when the amount of $YNbO_4$ and/or $YTaO_4$ and/or $MNbO_4$ and/or $MTaO_4$ is between about 4.4–5% on a molar basis;

(c) $YO_{3/2}$ is in the range of about 1.2–8.6% on a molar basis when the amount of $YNbO_4$ and/or $YTaO_4$ and/or $MNbO_4$ and/or $MTaO_4$ is between about 5–6% on a molar basis;

(d) $YO_{3/2}$ is in the range of about 0.8–8.6% on a molar basis when the amount of $YNbO_4$ and/or $YTaO_4$ and/or $MNbO_4$ and/or $MTaO_4$ is between about 6–7% on a molar basis; and (e) $YO_{3/2}$ is in the range of about 0.8–8% on a molar basis when the amount of $YNbO_4$ and/or $YTaO_4$ and/or $MNbO_4$ and/or $MTaO_4$ is between about 7–8% on a molar basis.

I claim:

1. A ceramic alloy consisting essentially of at least one member selected from the group consisting of partially stabilized $ZrO_2$, partially stabilized $ZrO_2$-$HfO_2$ solid solution, and partially stabilized $HfO_2$ exhibiting high toughness through the inclusion of 0.5–5 mole %, as expressed on the oxide basis, of a toughening agent selected from the group of $YNbO_4$ and/or $YTaO_4$ and/or $MNbO_4$ and/or $MTaO_4$, wherein M represents $Mg^{+2}$, $Ca^{+2}$, $Sc^{+2}$, and/or a rare earth metal selected from the group consisting of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$ which are substituted for $Y^{+3}$, one +3 cation being substituted for one $Y^{+3}$ cation, three +2 cations being substituted for two $Y^{+3}$ cations, three +4 cations for four $Y^{+3}$ cations, in which said partial stabilization is produced through the inclusion of 1.1–4.5 mole % stabilizer where the amount of toughening agent is between 0.5–4.4 mole % and of 0.6–4.5 mole % stabilizer where the amount of toughening agent is between 4.4–5 mole %, the microstructure of said alloy consisting predominantly of crystals having a tetragonal structure.

2. A ceramic body of improved toughness consisting essentially of 5–50% by volume of a ceramic alloy consisting essentially of at least one member selected from the group consisting of unstabilized $ZrO_2$, partially stabilized $ZrO_2$, unstabilized $ZrO_2$-$HfO_2$ solid solution, partially stabilized $ZrO_2$-$HfO_2$ solid solution, partially stabilized $HfO_2$ and unstabilized $HfO_2$ exhibiting high toughness through the inclusion of 0.5–5 mole %, as expressed on the oxide basis, of a toughening agent selected from the group consisting of $YnbO_4$ and/or $YTaO_4$ and/or $MNbO_4$ and/or $MTaO_4$, wherein M represents $Mg^{+2}$, $Ca^{+2}$, $Sc^{+3}$, and/or a rare earth metal selected from the group consisting of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$, which are substituted for $Y^{+3}$, one +3 cation being substituted for one $Y^{+3}$ cation, three +2 cations being substituted for two $Y^{+3}$ cations, and three +4 cations for four $Y^{+3}$ cations, the microstructure of said alloy consisting predominantly of crystals having a tetragonal structure, with the remainder of the body being a hard refractory ceramic.

3. A ceramic body according to claim 2 wherein said hard refractory ceramic consists of at least one member selected from the group consisting of α-alumina, β-alumina, β″-alumina, $Al_2O_3$-$Cr_2O_3$ solid solution, mullite, sialon, nasicon, silicon carbide, silicon nitride, spinel, titanium carbide, titanium diboride, zircon, and zirconium carbide.

4. A ceramic body of improved toughness consisting essentially of greater than 50% and up to 95% by volume of a ceramic alloy consisting essentially of at least one member selected from the group consisting of partially stabilized $ZrO_2$, partially stabilized $ZrO_2$-$HfO_2$ solid solution, and partially stabilized $HfO_2$ through the inclusion of 0.5–5 mole %, as expressed on the oxide basis, of a toughening agent selected from the group consisting of $YNbO_4$ and/or $YTaO_4$ and/or $MNbO_4$ and/or $MTaO_4$, wherein M represents $Mg^{+2}$, $Ca^{+2}$, $Sc^{+3}$, and/or a rare earth metal selected from the group consisting of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$ which are substituted for $Y^{+3}$, one +3 cation being substituted for one $Y^{+3}$ cation, three $+2$ cations being substituted for two $Y^{+3}$ cations, and three $+4$ cations being substituted for 4 $Y^{+3}$ cations, in which said partial stabilization is produced through the inclusion of 1.1–4.5 mole % stabilizer where the amount of toughening agent is between 0.5–4.4 mole % and of at least 0.6 mole % stabilizer where the amount of toughening agent is between 4.5–5 mole %, the microstructure of said alloy consisting predominantly of crystals having a tetragonal structure, with the remainder of the body being a hard refractory ceramic.

5. A ceramic body according to claim 4 wherein said hard refractory ceramic consists of at least one member selected from the group consisting of $\alpha$-alumina, $\beta$-alumina, $\beta''$-alumina, $Al_2O_3$-$Cr_2O_3$ solid solution, mullite, sialon, nasicon, silicon carbide, silicon nitride, spinel, titanium carbide, titanium diboride, zircon, and zirconium carbide.

6. A ceramic composition body of improved toughness consisting essentially of refractory ceramic fibers and/or whiskers and a ceramic alloy, said refractory ceramic fibers and/or whiskers comprising up to 80% by volume of said body and said ceramic alloy consisting essentially of at least one member selected from the group consisting of partially stabilized $ZrO_2$, partially stabilized $ZrO_2$-$HfO_2$ solid solution, and partially stabilized $HfO_2$ through the inclusion of 0.5–5 mole %, as expressed on the oxide basis, of a toughening agent selected from the group consisting of $YNbO_4$ and/or $YTaO_4$ and/or $MNbO_4$ and/or $MTaO_4$, wherein M represents $Mg^{+2}$, $Ca^{+2}$, $Sc^{+3}$, and/or a rare earth metal selected from the group consisting of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$ which are substituted for $Y^{+3}$, one $+3$ cation being substituted for one $Y^{+3}$ cation, three $+2$ cations being substituted for two $Y^{+3}$ cations, and three $+4$ cations being substituted for four $Y^{+3}$ cations, in which said partial stabilization is produced through the inclusion of 1.1–4.5 mole % stabilizer where the amount of toughening agent is between 0.5–4.4 mole % of 0.6–4.5 mole % stabilizer where the amount of toughening agent is between 4.4–5 mole %, the microstructure of said alloy consisting predominantly of crystals having a tetragonal structure.

7. A ceramic composite body according to claim 6 wherein said fibers and/or whiskers consist of at least one member selected from the group consisting of alumina, mullite, sialon, silicon carbide, silicon nitride, AlN, BN, $B_4C$, $ZrO_2$, zircon, silicon oxycarbide, and spinel.

8. A ceramic composite body of improved toughness consisting of a hard refractory ceramic, refractory ceramic fibers and/or whiskers, and a ceramic alloy consisting essentially of at least one member selected from the group consisting of partially stabilized $ZrO_2$, partially stabilized $ZrO_2$-$HfO_2$ solid solution, and partially stabilized $HfO_2$ exhibiting high toughness through the inclusion of 0.5–5 mole %, as expressed on the oxide basis, of a toughening agent selected from the group consisting of $YNbO_4$ and/or $YTaO_4$ and/or $MNbO_4$ and/or $MTaO_4$, wherein M represents $Mg^{+2}$, $Ca^{+2}$, $Sc^{+2}$, and/or a rare earth metal selected from the group consisting of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$ which are substituted for $Y^{+3}$, one $+3$ cation being substituted for one $Y^{+3}$ cation, three $+2$ cations being substituted for two $Y^{+3}$ cations, and three $+4$ cations for four $Y^{+3}$ cations, in which said partial stabilization is produced through the inclusion of 1.1–4.5 mole % stabilizer where the amount of toughening agent is between 0.5–4.4 mole % and of 0.6–4.5 mole % stabilizer where the amount of toughening agent is between 4.4–5 mole %, the microstructure of said alloy consisting predominantly of crystals having a tetragonal structure, said hard refractory ceramic being present in an amount less than 50% by volume, said ceramic alloy being present in an amount of at least 5% by volume, and said refractory ceramic fibers and/or whiskers comprising the remainder of said body but in an amount not exceeding 80% by volume.

9. A ceramic composite body according to claim 8 wherein said fibers and/or whiskers consist of at least one member selected from the group consisting of alumina, mullite, sialon, silicon carbide, silicon nitride, AlN, BN, $B_4C$, $ZrO_2$, zircon, silicon oxycarbide, and spinel, and wherein said hard refractory ceramic consists of at least one member selected from the group consisting of $\alpha$-alumina, $\beta$-alumina, $\beta''$-alumina, $Al_2O_3$-$Cr_2O_3$ solid solution, mullite, sialon, nasicon, silicon carbide, silicon nitride, spinel, titanium carbide, titanium diboride, zircon, and zirconium carbide.

10. A ceramic composite body of improved toughness consisting of a hard refractory ceramic, refractory ceramic fibers and/or whiskers, and a ceramic alloy consisting essentially of at least one member selected from the group consisting of unstabilized $ZrO_2$, partially stabilized $ZrO_2$, unstabilized $ZrO_2$-$HfO_2$ solid solution, partially stabilized $ZrO_2$-$HfO_2$ solid solution, partially stabilized $HfO_2$ and unstabilized $HfO_2$ exhibiting high toughness through the inclusion of 0.5–5 mole %, as expressed on the oxide basis, of a toughening agent selected from the group consisting of $YNbO_4$ and/or $YTaO_4$ and/or $MNbO_4$ and/or $MTaO_4$, wherein M represents $Mg^{+2}$, $Ca^{+2}$, $Sc^{+3}$, and/or a rare earth metal selected from the group consisting of $La^{+3}$, $Ce^{+4}$, $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Lu^{+3}$ which are substituted from $Y^{+3}$, one $+3$ cation being substituted for one $Y^{+3}$ cation, three $+2$ cations being substituted for two $Y^{+3}$ cations, and three $+4$ cations for four $Y^{+3}$ cations, the microstructure of said alloy consisting predominantly of crystals having a tetragonal structure, said hard refractory ceramic being present in an amount greater than 50% by volume, said ceramic alloy being present in an amount of at least 5% by volume, and said refractory fibers and/or whiskers comprising the remainder of said body.

11. A ceramic composite body according to claim 10 wherein said hard refractory ceramic consists of at least one member selected from the group consisting of $\alpha$-alumina, $\beta$-alumina, $\beta''$-alumina, $Al_2O_3$-$Cr_2O_3$ solid solution, mullite, sialon, nasicon, silicon carbide, silicon nitride, spinel, titanium carbide, titanium diboride, zircon, and zirconium carbide, and wherein said fibers and/or whiskers consist of at least one member selected from the group consisting of alumina, mullite, sialon, silicon carbide, silicon nitride, AlN, BN, $B_4C$, $ZrO_2$, zircon, silicon oxycarbide, and spinel.

* * * * *

UNITED STATES PATENT AND TRADEMARK OFFICE
CERTIFICATE OF CORRECTION

PATENT NO. : 5,008,221
DATED : April 16, 1991
INVENTOR(S) : Thomas D. Ketcham

It is certified that error appears in the above-identified patent and that said Letters Patent is hereby corrected as shown below:

Col. 9, line 64, "9.41" should read --94.1--.

Col. 11, line 61, "comPosition" should read --composition--.

Col. 18, line 49, "+ 4% $YTaO_4$)" should read --+ 4% $YTaO_4$--. No parenthesis.

Col. 19, line 16, "$MNbO_4$)" should read --($MNbO_4$)--.

Col. 21, line 26, insert --$Y_2O_3$ )--after 2 mole %.

Col. 23, Table XI, Example R, "$NbO_4$" should read --$YNbO_4$--.

Col. 23, Table XI, Example U, "$YNbo_4$" should read --$YNbO_4$--.

Col. 23, Table XI, Example W, "$YNbo_4$" should read --$YNbO_4$--.

Col. 23, Table XI, Example X, "$YNbo_4$" should read --$YNbO_4$--.

Col. 23, Table XI, Example Y, "$YNbo_4$" should read --$YNbO_4$--.

Col. 23, Table XI, Example Z, "$YNbo_4$" should read --$YNbO_4$--.

Col. 30, line 10, "group of" should read --group consisting of--.

Col. 30, line 18, "three +4" should read --and three +4--.

UNITED STATES PATENT AND TRADEMARK OFFICE
CERTIFICATE OF CORRECTION

PATENT NO. :     5,008,221
DATED      :     April 16, 1991
INVENTOR(S):     Thomas D. Ketcham It is certified that error appears in the above-identified patent and that said Letters Patent is hereby corrected as shown below:

Col. 31, lines 6 and 7, "and of at least 0.6 mole %" should read
--and of 0.6-4.5 mole %--.

Signed and Sealed this

Thirteenth Day of October, 1992

*Attest:*

DOUGLAS B. COMER

*Attesting Officer*      Acting Commissioner of Patents and Trademarks